United States Patent
Chen et al.

(10) Patent No.: US 12,008,810 B2
(45) Date of Patent: Jun. 11, 2024

(54) VIDEO SEQUENCE SELECTION METHOD, COMPUTER DEVICE, AND STORAGE MEDIUM

(71) Applicant: Tencent Technology (Shenzhen) Company Limited, Shenzhen (CN)

(72) Inventors: Zhenfang Chen, Shenzhen (CN); Lin Ma, Shenzhen (CN); Wenhan Luo, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 611 days.

(21) Appl. No.: 17/225,969

(22) Filed: Apr. 8, 2021

(65) Prior Publication Data

US 2021/0224601 A1    Jul. 22, 2021

Related U.S. Application Data

(63) Continuation of application No. PCT/CN2020/077481, filed on Mar. 2, 2020.

(30) Foreign Application Priority Data

Mar. 5, 2019  (CN) .......................... 201910165102.1

(51) Int. Cl.
*G06V 20/40* (2022.01)
*G06F 18/214* (2023.01)
(Continued)

(52) U.S. Cl.
CPC .......... *G06V 20/46* (2022.01); *G06F 18/2148* (2023.01); *G06F 40/279* (2020.01);
(Continued)

(58) Field of Classification Search
CPC ...... G06V 20/46; G06V 10/454; G06V 10/82; G06V 10/758; G06V 10/22; G06V 10/764; G06F 40/279; G06F 18/2148; G06N 3/08
See application file for complete search history.

(56) References Cited

U.S. PATENT DOCUMENTS 9,621,917 B2 * 4/2017 Kottke ................. H04N 19/517
10,136,829 B2 * 11/2018 Deno ..................... A61B 5/316
(Continued)

FOREIGN PATENT DOCUMENTS

| CN | 102427507 A | 4/2012 |
| CN | 102740127 A | 10/2012 |

(Continued)

OTHER PUBLICATIONS

Tencent Technology, WO, PCT/CN2020/077481, Apr. 29, 2020, 5 pgs.
(Continued)

*Primary Examiner* — Qun Shen
(74) *Attorney, Agent, or Firm* — Morgan, Lewis & Bockius LLP

(57) ABSTRACT

This application discloses a video sequence selection method, applicable to a computer device, the method including: receiving a to-be-matched video and a to-be-matched text, the to-be-matched text having a to-be-matched text feature sequence; invoking a spatiotemporal candidate region generator to extract a spatiotemporal candidate region set from the to-be-matched video, the spatiotemporal candidate region set including N spatiotemporal candidate regions; performing feature extraction on each spatiotemporal candidate region by using a convolutional neural network, to obtain N to-be-matched video feature sequences; invoking an attention-based interactor to obtain a matching score corresponding to each spatiotemporal (Continued)

candidate region, the matching score being used for representing a matching relationship between the spatiotemporal candidate region and the to-be-matched text; and selecting a target spatiotemporal candidate region from the spatiotemporal candidate region set according to the matching score corresponding to each spatiotemporal candidate region, and outputting the target spatiotemporal candidate region. In this application, an association between the video and the text in time sequence is considered during matching, thereby increasing a degree of matching between a video sequence and the text.

20 Claims, 6 Drawing Sheets

(51) Int. Cl.
| | |
|---|---|
| G06F 40/279 | (2020.01) |
| G06N 3/08 | (2023.01) |
| G06V 10/22 | (2022.01) |
| G06V 10/44 | (2022.01) |
| G06V 10/75 | (2022.01) |
| G06V 10/764 | (2022.01) |
| G06V 10/82 | (2022.01) |

(52) U.S. Cl.
CPC .............. *G06N 3/08* (2013.01); *G06V 10/22* (2022.01); *G06V 10/454* (2022.01); *G06V 10/758* (2022.01); *G06V 10/764* (2022.01); *G06V 10/82* (2022.01)

(56) References Cited

U.S. PATENT DOCUMENTS

| | | | | |
|---|---|---|---|---|
| 2007/0065840 | A1* | 3/2007 | Naguibneva ......... | C12Q 1/6895 435/6.16 |
| 2009/0296989 | A1* | 12/2009 | Ramesh ................ | G06V 20/52 382/103 |
| 2009/0326049 | A1* | 12/2009 | Aristarkhov ....... | A61K 31/7088 435/6.12 |
| 2012/0321137 | A1* | 12/2012 | Cheng .................... | G06V 20/52 382/103 |
| 2014/0172417 | A1* | 6/2014 | Monk, II ................ | G06F 40/30 704/9 |
| 2018/0025749 | A1* | 1/2018 | Oh .......................... | G06T 13/80 386/278 |
| 2019/0228269 | A1* | 7/2019 | Brent ..................... | G06V 10/82 |
| 2019/0294915 | A1* | 9/2019 | Geva .................. | G06F 18/2135 |
| 2020/0327378 | A1* | 10/2020 | Smith .................... | G06N 5/048 |
| 2021/0079366 | A1* | 3/2021 | Zhang ................... | C12N 15/86 |

FOREIGN PATENT DOCUMENTS

| | | |
|---|---|---|
| CN | 108229285 A | 6/2018 |
| CN | 109919078 A | 6/2019 |

OTHER PUBLICATIONS

Tencent Technology, IPRP, PCT/CN2020/077481, Aug. 25, 2021, 6 pgs.
Da Zhang et al., "MAN: Moment Alignment Network for Natural Language Moment Retrieval via Iterative Graph Adjustment", arxiv. org, Cornell University, Ithaca, NY 14853, Nov. 30, 2018, pp. 1-11, XP080987656.
Extended European Search Report, EP20767030.8, Apr. 12, 2022, 13 pgs.
Vasili Ramanishka et al., "Top-Down Visual Saliency Guided by Captions", arxiv.org, Cornell University, Ithaca, NY 14853, Dec. 21, 2016, XP080742228, 13 pgs.
Tencent Technology, ISR, PCT/CN2020/077481, Apr. 29, 2020, 2 pgs.
Tencent Technology, European Office Action, EP Patent Application No. 20767030.8, Dec. 18, 2023, 8 pgs.

* cited by examiner

VIDEO SEQUENCE SELECTION METHOD, COMPUTER DEVICE, AND STORAGE MEDIUM

CROSS-REFERENCE TO RELATED APPLICATIONS

This application is a continuation application of PCT Patent Application No. PCT/CN2020/077481, entitled "VIDEO SEQUENCE SELECTION METHOD, AND MODEL TRAINING METHOD AND APPARATUS" filed on Mar. 2, 2020, which claims priority to Chinese Patent Application No. 201910165102.1, entitled "VIDEO SEQUENCE SELECTION METHOD, AND MODEL TRAINING METHOD AND APPARATUS" and filed on Mar. 5, 2019, both of which are incorporated herein by reference in their entirety.

FIELD OF THE TECHNOLOGY

This application relates to the field of artificial intelligence (AI) technologies, and in particular, to a video sequence selection method, a computer device, and a storage medium.

BACKGROUND OF THE DISCLOSURE

Artificial intelligence (AI) is a branch of computer science, and its main goal is to make machines adequate for some complex tasks that generally require human intelligence to complete. As AI is gaining more attention, and along with the continuous development of computer network technologies, multimedia technologies, and digital transmission technologies, and the continuous popularization of digital devices such as cameras, mobile phones, and tablet computers, the data volume of videos increases dramatically. Faced with massive videos, how to effectively process the massive videos enables a user to quickly obtain required information is a key issue of the current research and application.

Currently, when required content is extracted from a video, generally, a single frame and a text in the video are separately encoded, the text then matches each frame, to obtain a result of matching between each frame and the text, a spatial position of the single frame in the video is then obtained according to the result of matching, and the spatial positions are connected in series to finally obtain a video sequence associated with the text.

However, although the video sequence generated in the foregoing manner is correlated to the text, only a matching relationship between the single frame and the text is considered, resulting in a relatively low degree of matching between the outputted video sequence and the text, which is not conducive to understand the video content.

SUMMARY

Embodiments of this application provide a video sequence selection method, a computer device, and a storage medium. Because a spatiotemporal candidate region includes a relationship between image in time and space, a temporal association between a video and a text is considered during matching, that is, the influence of video temporal information on a video sequence and the text is considered, thereby increasing the degree of matching between the outputted video sequence and the text, facilitating a better understanding of video content.

In view of this, a first aspect of this application provides a video sequence selection method, applicable to a computer device, the method including:
  receiving, by the computer device, a to-be-matched video and a to-be-matched text, the to-be-matched video including a plurality of frames, the to-be-matched text including at least one word, and the to-be-matched text having a to-be-matched text feature sequence;
  invoking, by the computer device, a spatiotemporal candidate region generator to extract a spatiotemporal candidate region set from the to-be-matched video, the spatiotemporal candidate region set including N spatiotemporal candidate regions, N being an integer greater than or equal to 1, and each spatiotemporal candidate region corresponding to a respective video sequence in the to-be-matched video;
  performing, by the computer device, feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set;
  invoking, by the computer device, an attention-based interactor to obtain a matching score corresponding to each spatiotemporal candidate region, the interactor being configured to process the to-be-matched video feature sequence and the to-be-matched text feature sequence, and the matching score being used for representing a matching relationship between the spatiotemporal candidate region and the to-be-matched text; and selecting, by the computer device, from the spatiotemporal candidate region set, a target spatiotemporal candidate region having a highest matching score outputted by the interactor, and outputting the target spatiotemporal candidate region.

A second aspect of this application provides a video sequence selection apparatus, including:
  an obtaining module, configured to receive a to-be-matched video and a to-be-matched text, the to-be-matched video including a plurality of frames, the to-be-matched text including at least one word, and the to-be-matched text having a to-be-matched text feature sequence;
  a generation module, configured to invoke a spatiotemporal candidate region generator to extract a spatiotemporal candidate region set from the to-be-matched video, the spatiotemporal candidate region set including N spatiotemporal candidate regions, N being an integer greater than or equal to 1, and each spatiotemporal candidate region corresponding to a respective video sequence in the to-be-matched video;
  an encoding module, configured to perform feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set;
  the obtaining module, further configured to invoke an attention-based interactor to obtain a matching score corresponding to each spatiotemporal candidate region, the interactor being configured to process the to-be-matched video feature sequence and the to-be-matched text feature sequence, and the matching score being used for representing a matching relationship between the spatiotemporal candidate region and the to-be-matched text; and a selection module, configured to: select from the spatiotemporal candidate region set, a target spatiotemporal candidate region having a highest matching score outputted by the interactor, and output the target spatiotemporal candidate region.

In some embodiments, in a first implementation of the second aspect of the embodiments of this application, the generation module is configured to: invoke the spatiotemporal candidate region generator to obtain a candidate region and a confidence score of each frame in the to-be-matched video, each candidate region corresponding to a respective confidence score; obtain a degree of overlap between every two adjacent frames in the to-be-matched video; and generate the spatiotemporal candidate region set according to the candidate region and the confidence score of each frame and the overlap degrees.

In some embodiments, in a second implementation of the second aspect of the embodiments of this application, the obtaining module is configured to: invoke, for each spatiotemporal candidate region, an encoder of the interactor to encode the to-be-matched video feature sequence corresponding to the spatiotemporal candidate region, to obtain a visual feature set, the visual feature set including at least one visual feature; invoke the encoder of the interactor to encode the to-be-matched text feature sequence, to obtain a text feature set, the text feature set including at least one text feature; determine a visual text feature set according to the visual feature set and the text feature set, the visual text feature set including at least one visual text feature, the visual text feature representing a visual feature-based text feature; and determine the matching score corresponding to the spatiotemporal candidate region according to the visual text feature set and the visual feature set.

In some embodiments, in a third implementation of the second aspect of the embodiments of this application, the obtaining module is configured to: calculate the visual feature set in the following manner:

$H_p = \{h_t^p\}_{t=1}^{t_p}$, and $h_t^p = LSTM_p(f_t^p, h_{t-1}^p)$, $H_p$ representing the visual feature set, $h_t^p$ representing a $t^{th}$ visual feature in the visual feature set, $t_p$ representing a time step in the spatiotemporal candidate region, $h_{t-1}^p$ representing a $(t-1)^{th}$ visual feature in the visual feature set, $LSTM_p()$ representing a first long short-term memory LSTM network encoder, and $f_t^p$ representing a $t^{th}$ row of features in the to-be-matched video feature sequence; and calculate the text feature set in the following manner:

$H_q = \{h_t^q\}_{t=1}^{t_q}$, and $h_t^q = LSTM_q(f_t^q, h_{t-1}^q)$, $H_q$ representing the text feature set, $h_t^q$ representing a $t^{th}$ text feature in the text feature set, $t_q$ representing a word quantity of the to-be-matched text, $h_{t-1}^q$ representing a $(t-1)^{th}$ text feature in the text feature set, $LSTM_q()$ representing a second LSTM encoder, and $f_t^q$ representing a $t^{th}$ row of features in the to-be-matched text feature sequence.

In some embodiments, in a fourth implementation of the second aspect of the embodiments of this application, the obtaining module is configured to: invoke the interactor to calculate an attention weight of the text feature corresponding to the visual feature according to the visual feature set and the text feature set; calculate a normalized attention weight of the text feature corresponding to the visual feature according to the attention weight; and calculate the visual text feature set according to the normalized attention weight and the text feature.

In some embodiments, in a fifth implementation of the second aspect of the embodiments of this application, the obtaining module is configured to: calculate the attention weight in the following manner:

$e_{i,j} = w^T \tanh(W^g h_j^q + W^p h_i^p + b_1) + b_2$, $e_{i,j}$ representing an attention weight of a $j^{th}$ text feature corresponding to an $i^{th}$ visual feature, $h_j^q$ representing the $j^{th}$ text feature, $h_i^p$ representing the $i^{th}$ visual feature, $W^T$ representing a first model parameter, $W^q$ representing a second model parameter, $W^p$ representing a third model parameter, $b_1$ representing a fourth model parameter, $b_2$ representing a fifth model parameter, and $\tanh()$ representing a hyperbolic tangent function;

calculate the normalized attention weight in the following manner:

$$a_{i,j} = \frac{\exp(e_{i,j})}{\sum_{k=1}^{t_q} \exp(e_{i,k})},$$

$a_{i,j}$ representing a normalized attention weight of the $j^{th}$ text feature corresponding to the $i^{th}$ visual feature, $t_q$ representing a word quantity of the to-be-matched text, k representing a $k^{th}$ word in the to-be-matched text, k being an integer greater than or equal to 1 and less than or equal to $t_q$, and $\exp()$ representing an exponential function; and calculate the visual text feature set in the following manner:

$H_{qp} = \{h_{qp}\}_{t=1}^{t_p}$; and $$h_{qp} = \sum_{j=1}^{t_q} a_{i,j} h_j^q,$$

$H_{qp}$ representing the visual text feature set, $t_p$ representing a time step of the spatiotemporal candidate region, and $h_{qp}$ representing the visual text feature.

In some embodiments, in a sixth implementation of the second aspect of the embodiments of this application, the obtaining module is configured to calculate the matching score in the following manner:

$$s(q, p) = \frac{1}{t_p} \sum_{i=1}^{t_p} s_i(h_i^p, h_i^{qp}); \text{ and}$$

$s_i(h_i^p, h_i^{qp}) = \phi(h_i^p, h_i^{qp})$, s (q, p) representing the matching score corresponding to the spatiotemporal candidate region, $s_i(h_i^p, h_i^{qp})$ representing a matching subscore between a visual feature and a visual text feature that correspond to an $i^{th}$ time step, $h_i^{qp}$ representing the visual text feature corresponding to the $i^{th}$ time step, $h_i^p$ representing the visual feature corresponding to the $i^{th}$ time step, and $\phi(\ )$ representing a similarity calculation function.

A third aspect of this application provides a model training apparatus, including:

an obtaining module, configured to obtain a first to-be-trained video, a second to-be-trained video, a first to-be-trained text, and a second to-be-trained text, the first to-be-trained video having a matching relationship with the first to-be-trained text, the first to-be-trained video having no matching relationship with the second to-be-trained text, the second to-be-trained video having a matching relationship with the second to-be-trained text, and the second to-be-trained video having no matching relationship with the first to-be-trained text;

a determining module, configured to determine a permutation loss function according to the first to-be-trained video, the second to-be-trained video, the first to-be-trained text, and the second to-be-trained text that are obtained by the obtaining module, the permutation loss function being configured to process the first to-be-trained video and the second to-be-trained text and process the second to-be-trained video and the first to-be-trained text, the determining module being further configured to determine a diversity loss function according to the first to-be-trained video, the second to-be-trained video, the first to-be-trained text, and the second to-be-trained text that are obtained by the obtaining module, the diversity loss function being configured to process the first to-be-trained video and the first to-be-trained text and process the second to-be-trained video and the second to-be-trained text; and the determining module being further configured to determine a target loss function according to the permutation loss function and the diversity loss function; and a training module, configured to train a to-be-trained interactor by using the target loss function determined by the determining module, to obtain the attention-based interactor, the interactor being configured to output a matching score between the to-be-matched video and the to-be-matched text.

In some embodiments, in a first implementation of the third aspect of the embodiments of this application, the determining module is configured to: obtain a first spatiotemporal candidate region set in the first to-be-trained video, and obtain a second spatiotemporal candidate region set in the second to-be-trained video, the first spatiotemporal candidate region set including at least one first spatiotemporal candidate region, the first spatiotemporal candidate region being a video sequence, the second spatiotemporal candidate region set including at least one second spatiotemporal candidate region, and the second spatiotemporal candidate region being a video sequence; calculate a first matching score according to the first to-be-trained text and the second spatiotemporal candidate region set; calculate a second matching score according to the second to-be-trained text and the first spatiotemporal candidate region set; calculate a third matching score according to the first to-be-trained text and the first spatiotemporal candidate region set; and determine the permutation loss function according to the first matching score, the second matching score, and the third matching score.

In some embodiments, in a second implementation of the third aspect of the embodiments of this application, the determining module is configured to: determine a matching behavior distribution according to a first spatiotemporal candidate region set and the first to-be-trained text, the first spatiotemporal candidate region set being generated according to the first to-be-trained video, and the matching behavior distribution representing a matching relationship between each first spatiotemporal candidate region in the first spatiotemporal candidate region set and the first to-be-trained text; perform normalization processing on the matching behavior distribution, to obtain a target matching behavior distribution; and determine the diversity loss function according to the target matching behavior distribution.

In some embodiments, in a third implementation of the third aspect of the embodiments of this application, the determining module is configured to: obtain a control coefficient, and determine the target loss function according to the control coefficient, the permutation loss function, and the diversity loss function.

A fourth aspect of this application provides a computer device, including: a memory, a processor, and a bus system connected to the memory and the processor, and a plurality of instructions stored in the memory that, when executed by the processor, cause the computer device to perform a plurality of operations including:

receiving a to-be-matched video and a to-be-matched text, the to-be-matched video including a plurality of frames, the to-be-matched text including at least one word, and the to-be-matched text having a to-be-matched text feature sequence;

invoking a spatiotemporal candidate region generator to extract a spatiotemporal candidate region set from the to-be-matched video, the spatiotemporal candidate region set including N spatiotemporal candidate regions, N being an integer greater than or equal to 1, and each spatiotemporal candidate region corresponding to a respective video sequence in the to-be-matched video;

performing feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set;

invoking an attention-based interactor to obtain a matching score corresponding to each spatiotemporal candidate region, the interactor being configured to process the to-be-matched video feature sequence and the to-be-matched text feature sequence, and the matching score being used for representing a matching relationship between the spatiotemporal candidate region and the to-be-matched text; and selecting from the spatiotemporal candidate region set, a target spatiotemporal candidate region having a highest matching score outputted by the interactor, and outputting the target spatiotemporal candidate region; and the bus system being configured to connect the memory and the processor to enable the memory and the processor to perform communication.

A fifth aspect of this application provides a non-transitory computer-readable storage medium, the computer-readable storage medium storing instructions, the instructions, when run on a computer device, causing the computer device to perform the video sequence selection method according to the foregoing first aspect.

It can be seen from the foregoing technical solutions that the embodiments of this application have the following advantages:

The embodiments of this application provide a video sequence selection method. A to-be-matched video and a to-be-matched text are first received, the to-be-matched video including a plurality of frames, the to-be-matched text including at least one word, and the to-be-matched text having a to-be-matched text feature sequence. A spatiotemporal candidate region set is then extracted from the to-be-matched video. Feature extraction needs to be next performed on each spatiotemporal candidate region in the spatiotemporal candidate region set, to obtain N to-be-matched video feature sequences, each to-be-matched video feature sequence corresponding to a respective spatiotemporal candidate region in the spatiotemporal candidate region set. An attention-based interactor may be then invoked to obtain a matching score corresponding to each spatiotemporal candidate region. A target spatiotemporal candidate region is finally selected from the spatiotemporal candidate region set according to the matching score corresponding to each spatiotemporal candidate region, each spatiotemporal candidate region corresponding to a respective video sequence in the to-be-matched video. By means of the above method, the spatiotemporal candidate region in a video is matched with the text, instead of matching each frame in the video with the text. The advantage of this operation is that, because the spatiotemporal candidate region includes a relationship between image in time and space, a temporal association between a video and a text is considered during matching, that is, the influence of video temporal information on the video sequence and the text is considered, thereby increasing the degree of matching between the outputted video sequence and the text, facilitating a better understanding of video content.

DESCRIPTION OF EMBODIMENTS

Figure 1:
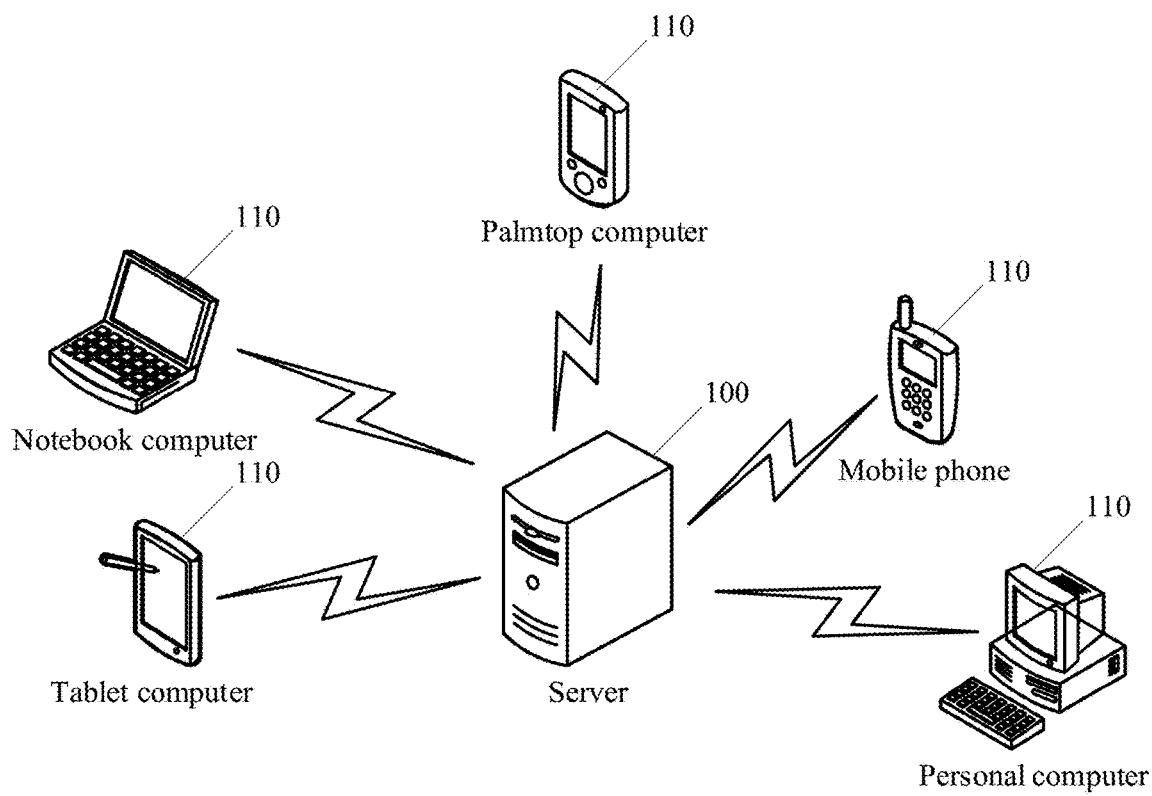
FIG. 1 is a schematic architectural diagram of a video sequence selection system according to an embodiment of this application.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that responds in a manner similar to human intelligence. AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies, and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Machine learning (ML) is a multi-disciplinary subject involving a plurality of disciplines such as probability theory, statistics, approximation theory, convex analysis, and algorithm complexity theory. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The machine learning and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The solutions provided in the embodiments of this application involve technologies such as CV and ML of AI, and are described by using the following embodiments.

Embodiments of this application provide a video sequence selection method, a computer device, and a storage medium. Because the spatiotemporal candidate region includes a relationship between image in time and space, a temporal association between a video and a text is considered during matching, that is, the influence of video temporal information on the video sequence and the text is considered, thereby increasing the degree of matching between the outputted video sequence and the text, facilitating a better understanding of video content.

In the specification, claims, and accompanying drawings of this application, the terms "first", "second", "third", "fourth", and the like (if existing) are intended to distinguish between similar objects rather than describe a specific sequence or a precedence order. It is to be understood that the data used in this way may be interchanged in an appropriate case, so that the embodiments of this application described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

This application is applicable to scenarios of video content understanding and positioning, including but not limited to, scenarios of video classification, scenarios of quick retrieval on a video website, and scenarios of fast positioning in a video. The video sequence selection method provided in this application can measure a matching relationship between a text and a video, to output a video sequence when a sentence and a video are given. For example, a video sequence related to a player Curry needs to be extracted from a video of the National Basketball Association (NBA), to make a video collection. First, through the method provided in this application, a plurality of spatiotemporal candidate regions are first generated. The spatiotemporal candidate regions are video sequences. A spatiotemporal candidate region that has a highest matching degree with the text is then selected from the spatiotemporal candidate regions as a target spatiotemporal candidate region according to a text "Curie's three-point shot". The target spatiotemporal candidate region can be recorded as a video sequence 1. Similarly, if a plurality of spatiotemporal candidate regions need to be extracted, different texts such as "Harden drives the ball" may be then inputted, and a spatiotemporal candidate region that has a highest matching degree with the text is then select from the spatiotemporal candidate regions as a target spatiotemporal candidate region. The target spatiotemporal candidate region can be recorded as a video sequence 2. If a video collection needs to be made, the video 1 and the video 2 may be spliced to get a final video.

For ease of understanding, this application provides a video sequence selection method. The method is applicable to the video sequence selection system shown in FIG. 1. FIG. 1 is a schematic architectural diagram of a video sequence selection system according to an embodiment of this application. As shown in FIG. 1, the video sequence selection method provided in this application is generally applicable to a computer device. The computer device may be a server 100, or may be a client. Description is made by using an example in which this application is applicable to a server.

Figure 2:
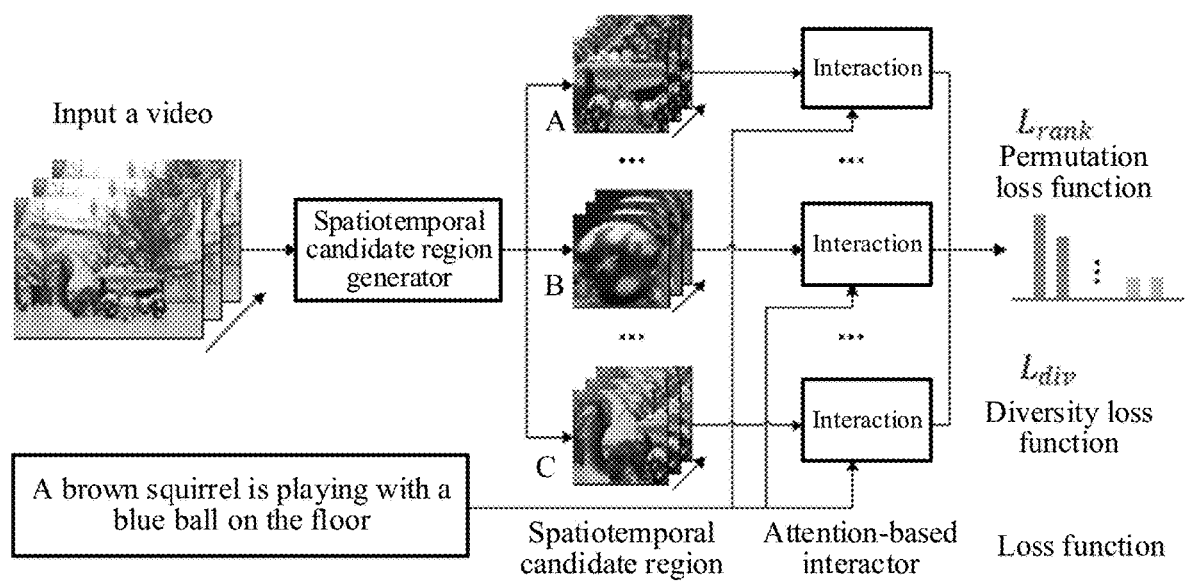
FIG. 2 is a schematic diagram of a framework and a procedure of a video sequence selection system according to an embodiment of this application.

On the basis of combining FIG. 1, FIG. 2 is a schematic diagram of a framework and a procedure of a video sequence selection system according to an embodiment of this application. As shown in FIG. 2, a server 100 obtains a video inputted from a client. The video may be alternatively data pre-stored in the server 100. This is not limited herein. Next, the server 100 extracts a plurality of spatiotemporal candidate regions such as a spatiotemporal candidate region A, a spatiotemporal candidate region B, and a spatiotemporal candidate region C in FIG. 2 from the video by using a spatiotemporal candidate region generator. A user may input a sentence such as "A brown squirrel is playing with a blue ball on the floor" through the client, and separately performs interaction between the sentence and the spatiotemporal candidate region A, the spatiotemporal candidate region B, and the spatiotemporal candidate region C by using an attention-based interactor. A matching score between the sentence and the spatiotemporal candidate region A is 60, a matching score between the sentence and the spatiotemporal candidate region B is 50, and a matching score between the sentence and the spatiotemporal candidate region C is 90. Therefore, the spatiotemporal candidate region C is used as an output of the target spatiotemporal candidate region. The spatiotemporal candidate region C is represented as a video sequence.

In addition, the attention-based interactor is obtained through optimization by using a loss function. The loss function may include a permutation loss function and a diversity function. This is not limited herein. The attention-based interactor is also referred to as a video text interaction model below.

The client is deployed on a terminal device 110. The terminal device 110 includes, but not limited to, a tablet computer, a notebook computer, a palmtop computer, a mobile phone, a speech interaction device, and a personal computer (PC), and is not limited herein. The voice interaction device includes, but not limited to a smart sound and a smart home appliance.

Figure 3:
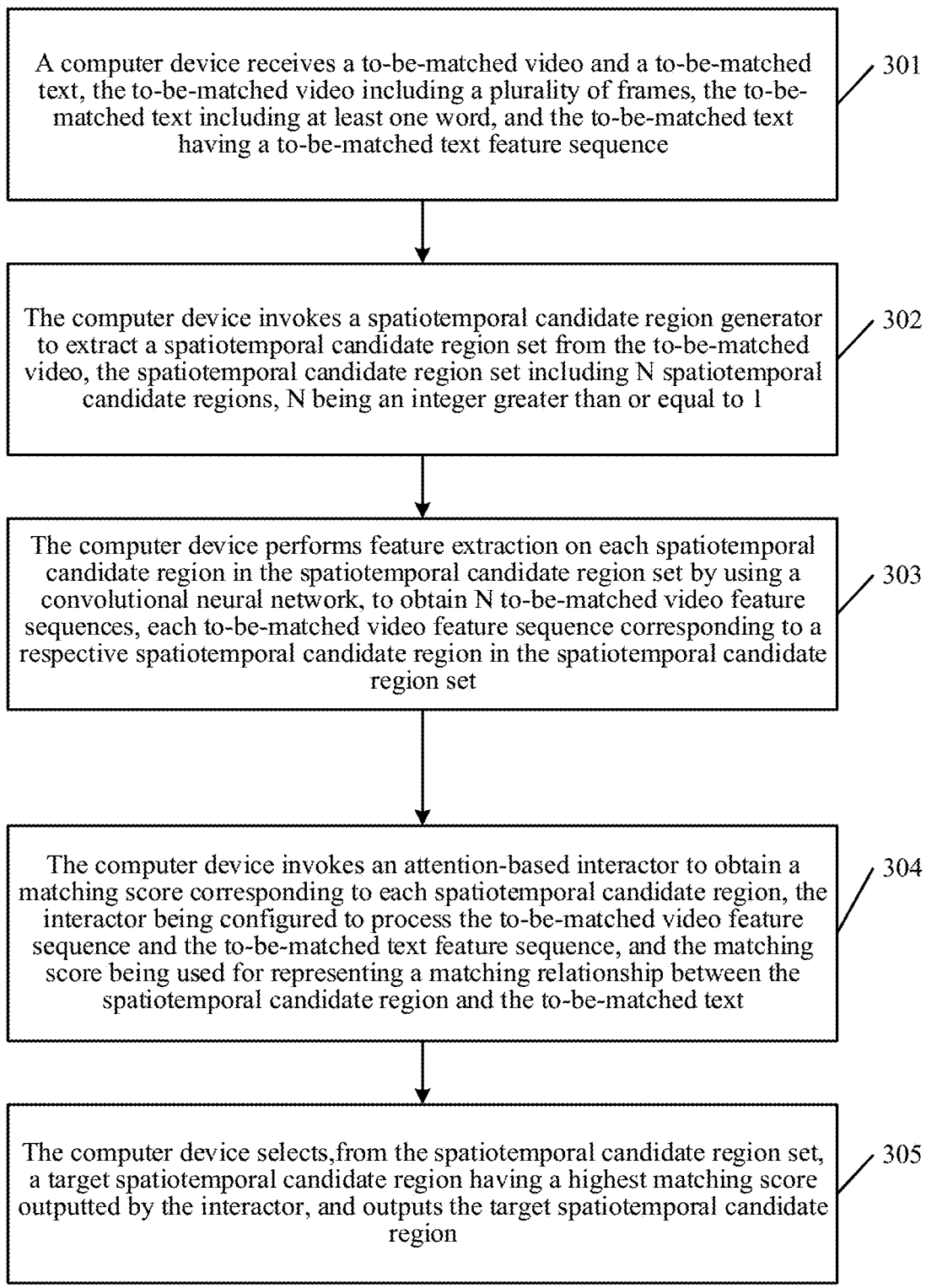
FIG. 3 is a schematic diagram of an embodiment of a video sequence selection method according to an embodiment of this application.

The video sequence selection method in this application is described below with reference to the foregoing descriptions. Referring to FIG. 3, an embodiment of the video sequence selection method in this application includes the following steps:

301. A computer device receives a to-be-matched video and a to-be-matched text, the to-be-matched video including a plurality of frames, the to-be-matched text including at least one word, and the to-be-matched text having a to-be-matched text feature sequence.

In this embodiment, the video sequence selection apparatus first needs to obtain the to-be-matched video and the to-be-matched text. The video sequence selection apparatus may be deployed on the server 100 shown in FIG. 1, or may be deployed on the terminal device 110 with relatively strong computing capability shown in FIG. 1. This is not limited herein. The to-be-matched video includes the plurality of frames, and the to-be-matched text includes the at least one word. After the to-be-matched text is obtained, the to-be-matched text may be processed by using a word vector model, to mathematize a language, so that the to-be-matched text feature sequence is obtained. The to-be-matched text feature sequence includes at least one word vector. The word vector is a vector representation of a word. If the to-be-matched text is a sentence q, the sentence q is encoded, to obtain a to-be-matched text feature sequence $F_q$, and $F_q \in R^{t_q \times d_q}$. $t_q$ represents a word quantity in the sequence q, and $d_q$ represents a feature length of the word vector.

Video formats of the to-be-matched video include, but not limited to, a Moving Picture Experts Group (MPEG) format, an audio video interleaving (AVI) format, an advanced streaming format (ASF), a Windows Media Video (WMV) format, a 3rd generation partnership project file format (3GPP file format), a multimedia container ((MKV) file format, a flash video, and RealMedia variable bitrate (RMVB) file format.

Language types of the to-be-matched text include, but not limited to, Chinese, English, Japanese, French, German, and Arabic.

302. The computer device invokes a spatiotemporal candidate region generator to extract a spatiotemporal candidate region set from the to-be-matched video, the spatiotemporal candidate region set including N spatiotemporal candidate regions, N being an integer greater than or equal to 1, each spatiotemporal candidate region corresponding to a respective video sequence in the to-be-matched video.

In this embodiment, the video sequence selection apparatus processes the to-be-matched video, to obtain a series of spatiotemporal candidate regions. The series of spatiotemporal candidate regions is referred to as a spatiotemporal candidate region set. The spatiotemporal candidate region set includes N spatiotemporal candidate regions, and may be represented as $P=\{p_i\}_{i=1}^{N}$. N is a total quantity of spatiotemporal candidate regions in the spatiotemporal candidate region set, and one spatiotemporal candidate region is one video sequence.

303. The computer device performs feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set.

In this embodiment, the video sequence selection apparatus separately encodes each spatiotemporal candidate region in the spatiotemporal candidate region set. A spatiotemporal candidate region is used as an example. If the spatiotemporal candidate region is represented as P, a corresponding sequence feature is extracted from the spatiotemporal candidate region by using a convolutional neural network. That is, a to-be-matched video feature sequence F is obtained, and $F_p \in R^{t_p \times t_d}$. $t_p$ represents a time step of the video, the time step represents a fixed length after the video is compressed, and $d_p$ represents a feature length of the video, for example, may be 6048 or 4096, or the like. This is not limited herein. Each spatiotemporal candidate region corresponds to a to-be-matched video feature sequence.

304. The computer device invokes an attention-based interactor to obtain a matching score corresponding to each spatiotemporal candidate region, the interactor being configured to process the to-be-matched video feature sequence and the to-be-matched text feature sequence, and the matching score being used for representing a matching relationship between the spatiotemporal candidate region and the to-be-matched text.

In this embodiment, the video sequence selection apparatus inputs each to-be-matched video feature sequence and the to-be-matched text feature sequence to the video text interaction model, and the video text interaction model outputs a corresponding matching score. For example, the spatiotemporal candidate region set includes 3 spatiotemporal candidate regions. Each spatiotemporal candidate region corresponds to a to-be-matched video feature sequence. For example, the spatiotemporal candidate region A corresponds to a to-be-matched video feature sequence A, the spatiotemporal candidate region B corresponds to a to-be-matched video feature sequence B, and the spatiotemporal candidate region C corresponds to a to-be-matched video feature sequence C. In this case, the to-be-matched video feature sequence A and the to-be-matched text feature sequence are inputted to the video text interaction model, and the video text interaction model outputs a matching score A. The to-be-matched video feature sequence B and the to-be-matched text feature sequence are inputted to the video text interaction model, and the video text interaction model outputs a matching score B. The to-be-matched video feature sequence C and the to-be-matched text feature sequence are inputted to the video text interaction model, and the video text interaction model outputs a matching score C. Generally, a higher matching score indicates a stronger matching relationship.

305. The computer device selects from the spatiotemporal candidate region set, a target spatiotemporal candidate region having a highest matching score outputted by the interactor, and outputs the target spatiotemporal candidate region.

In this embodiment, the video sequence selection apparatus selects a spatiotemporal candidate region that has a highest matching score from the spatiotemporal candidate regions as the target spatiotemporal candidate region according to the matching score corresponding to each spatiotemporal candidate region, and outputs the target spatiotemporal candidate region. The target spatiotemporal candidate region is a video sequence.

The embodiments of this application provide a video sequence selection method. A to-be-matched video and a to-be-matched text are first received, the to-be-matched video including a plurality of frames, the to-be-matched text including at least one word, and the to-be-matched text having a to-be-matched text feature sequence. A spatiotemporal candidate region set is then extracted from the to-be-matched video. Feature extraction needs to be next performed on each spatiotemporal candidate region in the spatiotemporal candidate region set, to obtain N to-be-matched video feature sequences, each to-be-matched video feature sequence corresponding to a respective spatiotemporal candidate region in the spatiotemporal candidate region set. A matching score corresponding to the each spatiotemporal candidate region may be then obtained by using the video text interaction model. A target spatiotemporal candidate region is finally selected from the spatiotemporal candidate region set according to the matching score corresponding to each spatiotemporal candidate region, each spatiotemporal candidate region corresponding to a respective video sequence in the to-be-matched video. By means of the above method, the spatiotemporal candidate region in a video is matched with the text, instead of matching each frame in the video with the text. The advantage of this operation is that, because the spatiotemporal candidate region includes a relationship between image in time and space, a temporal association between a video and a text is considered during matching, that is, the influence of video temporal information on the video sequence and the text is considered, thereby increasing the degree of matching between the outputted video sequence and the text, facilitating a better understanding of video content.

In some embodiments, based on the foregoing embodiment corresponding to FIG. 3, the video sequence selection method provided in this embodiment of this application further includes an optional embodiment. In the optional embodiment, in the foregoing step 302, the invoking, by the computer device, a spatiotemporal candidate region generator to extract a spatiotemporal candidate region set from the to-be-matched video may include:

invoking, by the computer device, the spatiotemporal candidate region generator to obtain a candidate region and a confidence score of each frame in the to-be-matched video, each candidate region corresponding to a respective confidence score; obtaining a degree of overlap between every two adjacent frames in the to-be-matched video; and generating the spatiotemporal candidate region set according to the candidate region and the confidence score of each frame and the overlap degrees.

Figure 4:
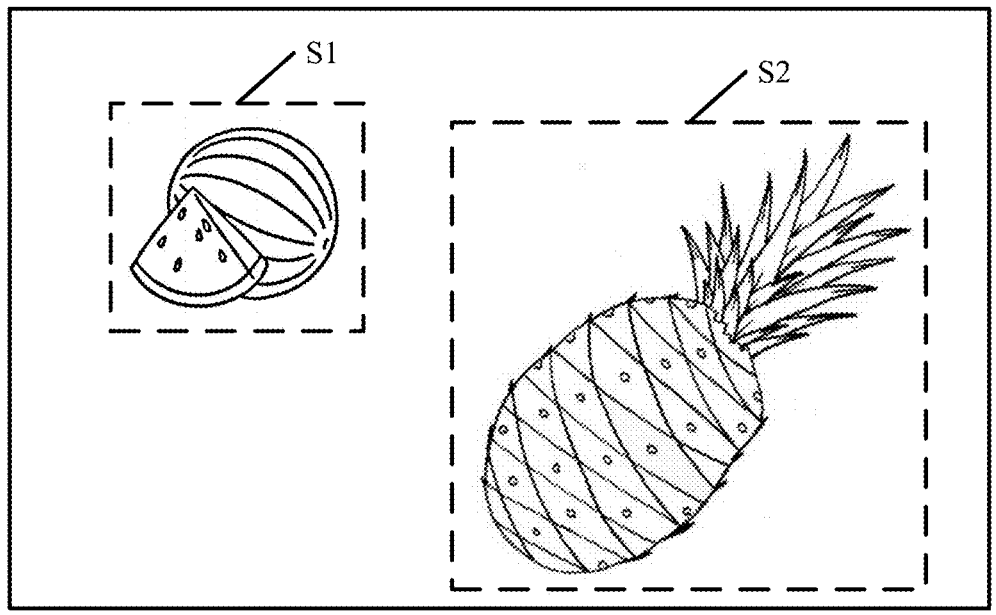
FIG. 4 is a schematic diagram of an embodiment of extracting a spatiotemporal candidate region according to an embodiment of this application.

In this embodiment, a manner of generating a spatiotemporal candidate region set according to the to-be-matched video is described. First, the video sequence selection apparatus detects each frame in the to-be-matched video by using a single-frame candidate region generation method, so that the candidate region and the confidence score in the each frame are obtained. For ease of understanding, FIG. 4 is a schematic diagram of an embodiment of extracting a spatiotemporal candidate region according to an embodiment of this application. As shown in FIG. 4, at least one candidate region may be extracted from one frame. The one frame does not have time sequence information, and a plurality of frames have the time sequence information. A candidate region S1 is an image of a watermelon, and a candidate region S2 is an image of a pineapple. It can be learned that, frame sizes corresponding to different candidate regions are different. The candidate region corresponding to the watermelon is used as an example. If 10 frames have similar confidence scores, and high overlap degree, the 10 frames form the spatiotemporal candidate region corresponding to the "watermelon".

The spatiotemporal candidate region is formed by a series of frames $\{b_i\}_{i=1}^T$, $b_i$ represents a candidate region in an $i^{th}$ frame in the to-be-matched video, and T represents a total quantity of frames of the to-be-matched video.

Second, the embodiments of this application further provide a manner of determining a spatiotemporal candidate region set. A candidate region and a confidence score of each frame in the to-be-matched video may be first obtained, each candidate region corresponding to a respective confidence score. A degree of overlap between every two adjacent frames in the to-be-matched video is then obtained. The spatiotemporal candidate region set is finally generated according to the candidate region and the confidence score of each frame and the overlap degrees. By means of the above method, a change in the time and the space of the video is combined, and an appearance signal and a motion signal in the video are also combined, to generate the spatiotemporal candidate region, thereby improving the accuracy of generating the spatiotemporal candidate region.

In some embodiments, based on the foregoing embodiment corresponding to FIG. 3, the video sequence selection method provided in this embodiment of this application further includes another optional embodiment. In the optional embodiment, in the foregoing step 304, the invoking, by the computer device, an attention-based interactor to obtain a matching score corresponding to each spatiotemporal candidate region may include: invoking, by the computer device for each spatiotemporal candidate region, an encoder of the interactor to encode the to-be-matched video feature sequence corresponding to the spatiotemporal candidate region, to obtain a visual feature set, the visual feature set including at least one visual feature; invoking, by the computer device, the encoder of the interactor to encode the to-be-matched text feature sequence, to obtain a text feature set, the text feature set including at least one text feature; invoking, by the computer device, the interactor to determine a visual text feature set according to the visual feature set and the text feature set, the visual text feature set including at least one visual text feature, the visual text feature representing a visual feature-based text feature; and determining the matching score corresponding to the spatiotemporal candidate region according to the visual text feature set and the visual feature set.

Figure 5:
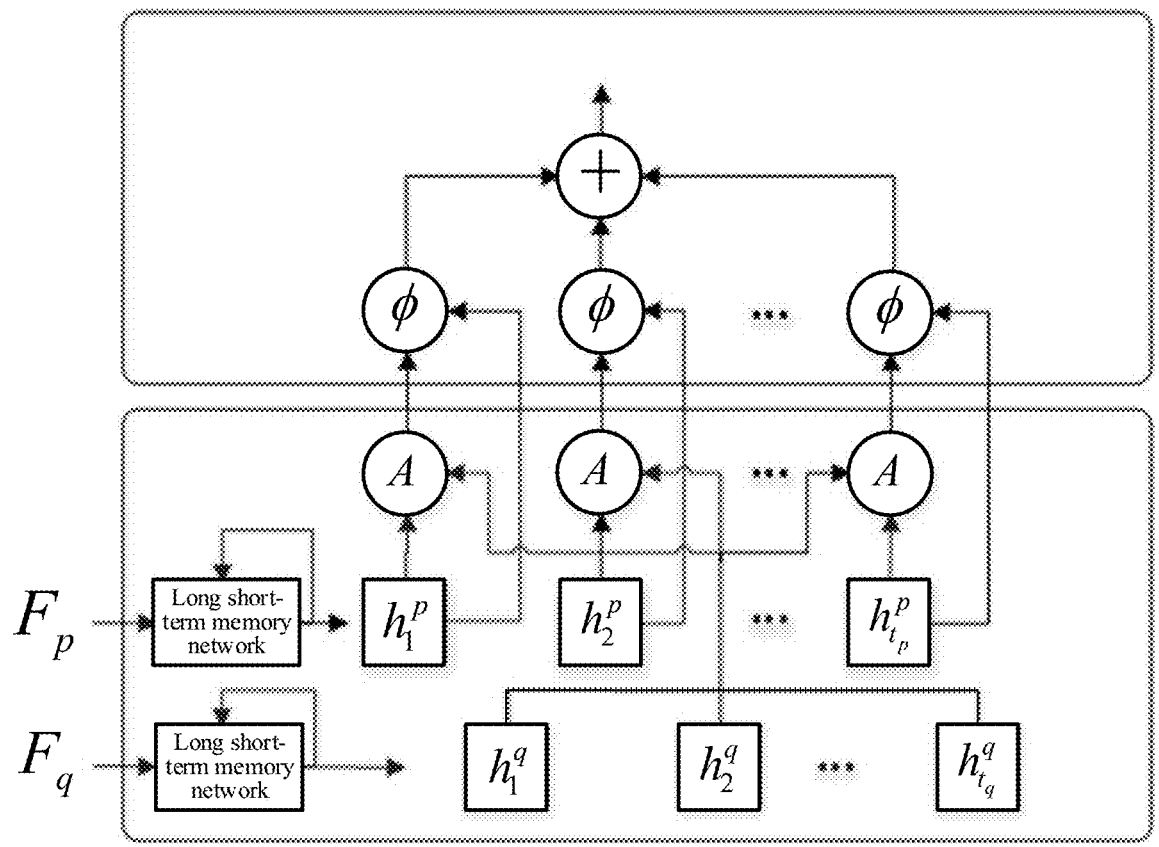
FIG. 5 is a schematic structural diagram of an attention mechanism-based interactor according to an embodiment of this application.

In this embodiment, an implementation of obtaining a matching score corresponding to the spatiotemporal candidate region by using the video text interaction model is described. For ease of understanding, FIG. 5 is a schematic structural diagram of an attention mechanism-based interactor according to an embodiment of this application. As shown in FIG. 5, for ease of description, a spatiotemporal candidate region is used as an example for description below. A to-be-matched video feature sequence $F_p$ and a to-be-matched text feature sequence $F_q$ corresponding to the spatiotemporal candidate region are first obtained, and two long short-term memory-based recurrent neural networks are then used as encoders. The LSTM encoder is a component of the video text interaction model.

A model training apparatus then inputs the to-be-matched video feature sequence $F_p$ to the LSTM encoder, and the LSTM encoder encodes the to-be-matched video feature sequence $F_p$, to obtain a visual feature set $H_p$. The visual feature set $H_p$ includes $t_p$ visual features $h^p$. The model training apparatus inputs the to-be-matched text feature sequence $F_q$ to another LSTM encoder, and the another LSTM encoder encodes the to-be-matched text feature sequence $F_q$, to obtain a text feature set $H_q$. The text feature set $H_q$ includes $t^q$ text features $h^q$.

The model training apparatus next performs targeted weighted summation on the text feature set $H_q$ by using the attention mechanism, to obtain a visual text feature set $H_{qp}$. The visual text feature set $H_{qp}$ includes $t_p$ visual text features $h_{qp}$, and the visual text feature is a visually oriented text feature. The model training apparatus finally calculates the visual text features $h^{qp}$ in the visual text feature set $H_{qp}$ and the visual features $h^p$ in the visual feature set $H_p$, to obtain $t_p$ scores, and performs summation on the $t_p$ scores, to obtain the matching score corresponding to the spatiotemporal candidate region.

The manners of processing the each spatiotemporal candidate region in the spatiotemporal candidate region set are all described above, to therefore obtain the matching scores of the spatiotemporal candidate regions in the spatiotemporal candidate region set. The manner of processing other spatiotemporal candidate regions is repeated herein again.

Second, the embodiments of this application further provide a manner of obtaining the matching score corresponding to the spatiotemporal candidate region. The to-be-matched video feature sequence is separately encoded by using the encoder of the video text interaction model, to obtain a visual feature set, the to-be-matched text feature sequence is encoded, to obtain a text feature set, a visual text feature set is then determined according to the visual feature set and the text feature set, and the matching score corresponding to the spatiotemporal candidate region is finally determined according to the visual text feature set and the visual feature set. By means of the above method, feature fusion is performed on the video and the text by using the interaction mechanism, and a matching relationship between the each spatiotemporal candidate region in the video and the text can be described. Therefore, matching with the text can be implemented in both time and space, thereby improving the ability to understand the video content.

In some embodiments, based on the foregoing another optional embodiment corresponding to FIG. 3, the video sequence selection method provided in this embodiment of this application further includes still another optional embodiment. In the optional embodiment, the invoking an encoder of the interactor to encode the to-be-matched video feature sequence, to obtain a visual feature set may include:

calculating the visual feature set in the following manner:

$$H_p = \{h_t^p\}_{t=1}^{t_p}, \text{ and}$$

$$h_t^p = \text{LSTM}_p(f_t^p, h_{t-1}^p),$$

$H_p$ representing the visual feature set, $h_t^p$ representing a $t^{th}$ visual feature in the visual feature set, $t_p$ representing a time step in the spatiotemporal candidate region, $h_{t-1}^p$ representing a $(t-1)^{th}$ visual feature in the visual feature set, $\text{LSTM}_p(\ )$ representing a first encoder, and $f_t^p$ representing a $t^{th}$ row of features in the to-be-matched video feature sequence.

The encoding the to-be-matched text feature sequence by using the encoder of the video text interaction model, to obtain a text feature set may include:

calculating the text feature set in the following manner:

$$H_q = \{h_t^q\}_{t=1}^{t_q}, \text{ and}$$

$$h_t^q = \text{LSTM}_q(f_t^q, h_{t-1}^q),$$

$H_q$ representing the text feature set, $h_t^q$ representing a $t^{th}$ text feature in the text feature set, $t_q$ representing a word quantity of the to-be-matched text, $h_{t-1}^q$ representing a $(t-1)^{th}$ text feature in the text feature set, $\text{LSTM}_q(\ )$ representing a second LSTM encoder, and $f_t^q$ representing a $t^{th}$ row of features in the to-be-matched text feature sequence.

In this embodiment, an implementation of generating a visual feature set and a text feature set is described. The following describes the manner of generating the visual feature set. That is, the $(t-1)^{th}$ visual feature $h_{t-1}^p$ in the visual feature set $H_p$ and the $t^{th}$ row of features $f_t^p$ in the to-be-matched video feature sequence $F_p$ are inputted to the first LSTM encoder by using the LSTM encoder, and the first LSTM encoder outputs the $t^{th}$ visual feature $h_t^p$. After the $t_p$ visual features $h_t^p$ are outputted, the visual feature set $H_p$ may be obtained.

The following describes the manner of generating the text feature set. That is, the $(t-1)^{th}$ text feature $h_{t-1}^q$ in the text feature set $H_q$ and the $t^{th}$ row of features $f_t^q$ in the to-be-matched text feature sequence $F_q$ are inputted to the second LSTM encoder by using the LSTM encoder, and the second LSTM encoder outputs the $t^{th}$ text feature $h_t^q$. After the $t_q$ text features $h_t^q$ are outputted, the text feature set $H_q$ may be obtained.

The LSTM encoder adds the filtering of past states, so that states that currently have more influence may be selected, instead that most recent states are simply selected. The structure of the LSTM encoder includes a forget gate, a learning gate, a memory gate and a use gate. The long-term memory enters the forget gate, and forgets content that is considered to be useless. The short-term memory and events are merged in the learning gate, and unnecessary information is removed. It is used as learned new information. The long-term memory that is not forgotten and the just learned new information are merged in the memory gate. The gate puts the two together. Because it is called the memory gate, the memory gate outputs an updated long-term memory. Finally, the use gate determines what to use from the previously known information and the just learned information, to make a prediction. Therefore, the use gate accepts the long-term memory and new information inputs, merges the long-term memory with the new information inputs, and determine what to output.

Further, the embodiments of this application further provide an implementation of encoding the to-be-matched video feature sequence by using the encoder, to obtain a visual feature set, and an implementation of encoding a to-be-matched text feature sequence by using the encoder, to obtain a text feature set. By means of the above method, the feature sequence is encoded, and the LSTM encoder is used for encoding. Therefore, an important event that has a relatively long interval and delay may be processed and predicted in a time sequence, thereby improving the feasibility and operability of the solutions.

In some embodiments, based on the foregoing another optional embodiment corresponding to FIG. 3, the video sequence selection method provided in this embodiment of this application further includes yet another optional embodiment. In the optional embodiment, the invoking, by the computer device, the interactor to determine a visual text feature set according to the visual feature set and the text feature set may include: invoking, by the computer device, the interactor to calculate an attention weight of the text feature corresponding to the visual feature according to the visual feature set and the text feature set; calculating a normalized attention weight of the text feature corresponding to the visual feature according to the attention weight; and calculating the visual text feature set according to the normalized attention weight and the text feature.

In this embodiment, a manner of generating a visual text feature set is described.

The attention mechanism is a main means for resolving an information overload problem, belongs to a resource allocation solution, and allocates computing resources to more important tasks. The attention mechanism used in this application may be multi-head attention, hard attention, key-value pair attention, or structured attention.

In the multi-head attention, a plurality of queries are used to calculate a plurality of pieces of information selected from input information in parallel. Each attention focuses on different parts of the input information. The hard attention is the expectation of all input information based on the attention distribution. There is still another attention that focuses on only one position. This is called the hard attention. The hard attention includes two implementations. One is to select input information with a highest probability. The other hard attention may be implemented by randomly sampling an attention distribution. The key-value pair attention may be used for expressing the input information in a key-value pair format. A "key" is used for calculating the attention distribution, and a "value" is used for generating the selected information. The structured attention intends to select information related to the tasks from the input information. Active attention performs a multinomial distribution on all pieces of the input information, and is in a flat structure. If the input information has a hierarchical structure, for example, the text may be divided into words, sentences, paragraphs, sections and chapters, and other different levels of granularity, hierarchical attention may be used to make a better information selection.

Further, the embodiments of this application further provide a manner of determining a visual text feature set. That is, an attention weight of the text feature corresponding to the visual feature is first obtained according to the visual feature set and the text feature set, a normalized attention weight of the text feature corresponding to the visual feature is then obtained according to the attention weight, and the visual text feature set is finally obtained according to the normalized attention weight and the text feature. By means of the above method, the attention mechanism is fully used to generate the visual text feature, so as to obtain more visual information of an objective that needs to be paid attention to and suppress other useless information, thereby greatly improving the efficiency and accuracy of processing the visual information, so that information that is more critical to the current task objective can be selected from the plurality of pieces of information.

In some embodiments, based on the foregoing yet another optional embodiment, the video sequence selection method provided in this embodiment of this application further includes another optional embodiment. In the optional embodiment, the invoking, by the computer device, the interactor to calculate an attention weight of the text feature corresponding to the visual feature according to the visual feature set and the text feature set may include:

obtaining the attention weight in the following manner:

$$e_{i,j}=w^T \tanh(W^g h_j^q + W^p h_i^p + b_1) + b_2, \text{ and}$$

$e_{i,j}$ representing an attention weight of a $j^{th}$ text feature corresponding to an $i^{th}$ visual feature, $h_j^q$ representing the $j^{th}$ text feature, $h_i^p$ representing the $i^{th}$ visual feature, $W^T$ representing a first model parameter, $W^q$ representing a second model parameter, $W^p$ representing a third model parameter, $b_1$ representing a fourth model parameter, $b_2$ representing a fifth model parameter, and tanh( ) representing a hyperbolic tangent function.

The calculating a normalized attention weight of the text feature corresponding to the visual feature according to the attention weight of the text feature corresponding to the visual feature may include:

calculating the normalized attention weight in the following manner:

$$a_{i,j} = \frac{\exp(e_{i,j})}{\sum_{k=1}^{t_q} \exp(e_{i,k})},$$

$a_{i,j}$ representing a normalized attention weight of the $j^{th}$ text feature corresponding to the $i^{th}$ visual feature, $t_q$ representing a word quantity of the to-be-matched text, k representing a $k^{th}$ word in the to-be-matched text, k being an integer greater than or equal to 1 and less than or equal to $t_q$, and exp( ) representing an exponential function.

The calculating the visual text feature set according to the normalized attention weight and the text feature includes:

calculating the visual text feature set in the following manner:

$$H_{qp} = \{h_{qp}\}_{t=1}^{t_p}; \text{ and}$$

$$h_{qp} = \sum_{j=1}^{t_q} a_{i,j} h_j^q,$$

$H_{qp}$ representing the visual text feature set, $t_p$ representing a time step of the spatiotemporal candidate region, and $h_{qp}$ representing the visual text feature.

In this embodiment, an implementation of calculating the visual text feature set is described. The $j^{th}$ text feature $h_j^q$ is first obtained from the text feature set $H_q$, and the $i^{th}$ visual feature $h_i^p$ is obtained from the visual feature set $H_p$. The attention weight is calculated in the following manner:

$$e_{i,j} = w^T \tanh(W^g h_j^q + W^p h_i^p + b_1) + b_2.$$

Next, normalization processing is performed on the attention weight. That is, the normalized attention weight is calculated in the following manner:

$$a_{i,j} = \frac{\exp(e_{i,j})}{\sum_{k=1}^{t_q} \exp(e_{i,k})}.$$

Finally, the visual text feature set is calculated in the following manner:

$$H_{qp} = \{h_{qp}\}_{t=1}^{t_p}; \text{ and}$$

$$h_{qp} = \sum_{j=1}^{t_q} a_{i,j} h_j^q.$$

Further, the embodiments of this application further provide an implementation of calculating the attention weight of the text feature corresponding to the visual feature, also provide an implementation of calculating the normalized attention weight of the text feature corresponding to the visual feature, and provide an implementation of calculating the visual text feature set. By means of the above method, a specific and feasible manner is provided for implementing the solutions, thereby improving practicality and feasibility of the solutions.

In some embodiments, based on the foregoing any optional embodiment, the video sequence selection method provided in this embodiment of this application further includes another optional embodiment. In the optional embodiment, the invoking, by the computer device, the interactor to determine the matching score corresponding to the spatiotemporal candidate region according to the visual text feature set and the visual feature set may include:

calculating the matching score in the following manner:

$$s(q, p) = \frac{1}{t_p} \sum_{i=1}^{t_p} s_i(h_i^p, h_i^{qp}); \text{ and}$$

$$s_i(h_i^p, h_i^{qp}) = \phi(h_i^p, h_i^{qp}),$$

s(q, p) representing the matching score corresponding to the spatiotemporal candidate region, $s_i$ ($h_i^p$, $h_i^{q\,p}$) representing a matching subscore between a visual feature and a visual text feature that correspond to an $i^{th}$ time step, $h_i^{qp}$ representing the visual text feature corresponding to the $i^{th}$ time step, $h_i^p$ representing the visual feature corresponding to the $i^{th}$ time step, and $\phi$( ) representing a similarity calculation function.

In this embodiment, an implementation of calculating the matching score corresponding to the spatiotemporal candidate region is described. One spatiotemporal candidate region is formed by a video sequence, one corresponding to-be-matched video feature sequence is obtained after the one spatiotemporal candidate region is encoded, and the one to-be-matched video feature sequence corresponds to a plurality of visual features. Therefore, calculation needs to be performed for each video feature, to obtain a matching subscore, and finally each matching subscore is added, to obtain the matching score corresponding to the entire spatiotemporal candidate region.

For ease of understanding, refer to the following formula:

$$s_i(h_i^p, h_i^{qp}) = \phi(h_i^p, h_i^{qp}).$$

This is the manner of calculating the matching subscore. That is, a matching subscore corresponding to an $i^{th}$ video feature is calculated. Similarly, the foregoing calculation is performed on the each video feature, to obtain a matching subscore of a $t_p^{th}$ video feature, and finally the following formula is used for calculation, to obtain the matching score of the entire spatiotemporal candidate region:

$$s(q, p) = \frac{1}{t_p} \sum_{i=1}^{t_p} S_i(h_i^p, h_i^{qp}).$$

Furthermore, the embodiments of this application further provide an implementation of determining the matching score corresponding to the spatiotemporal candidate region according to the visual text feature set and the visual feature set. By means of the above method, a specific and feasible manner is provided for implementing the solutions, thereby improving practicality and feasibility of the solutions.

Figure 6:
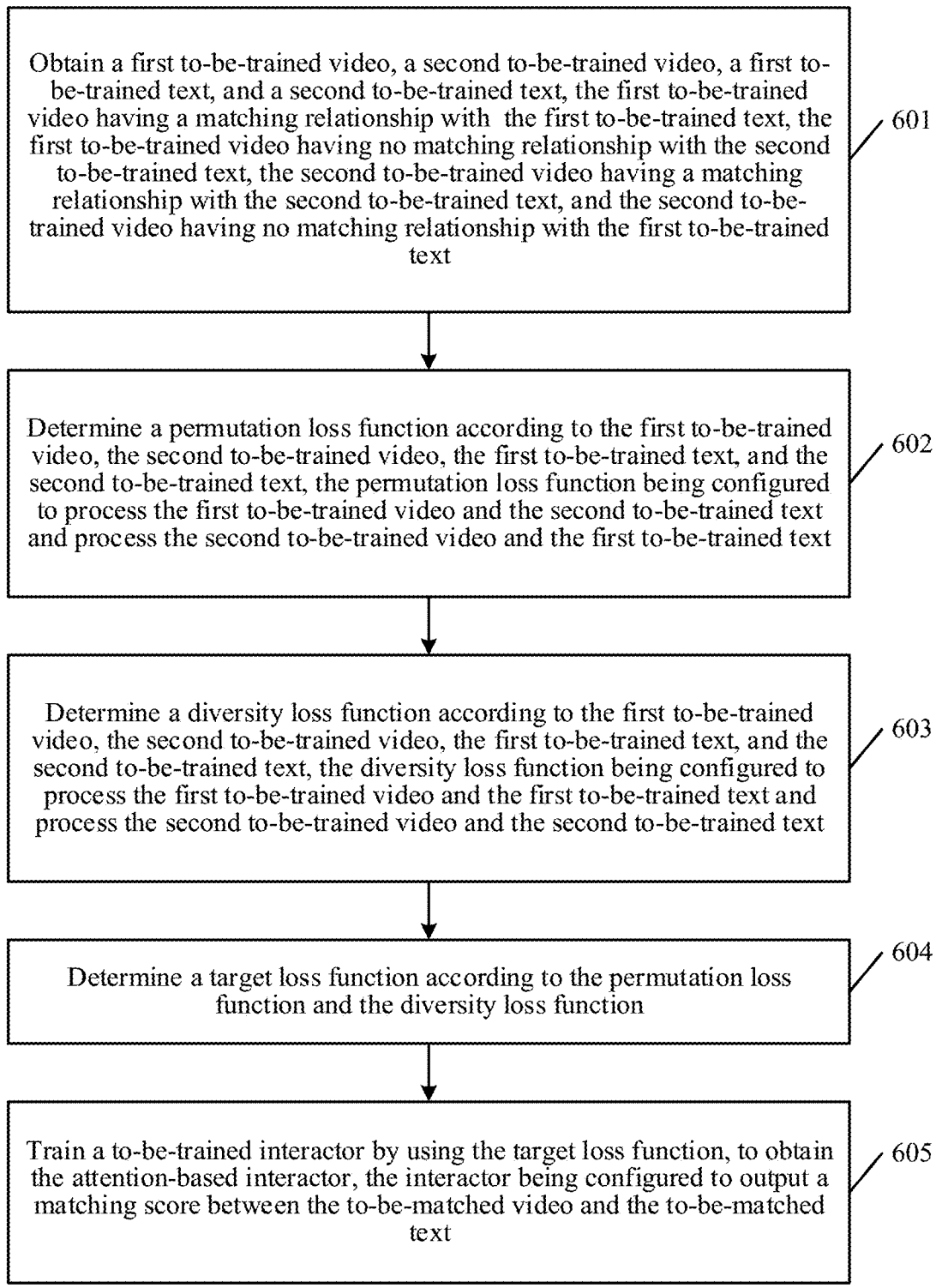
FIG. 6 is a schematic diagram of an embodiment of a model training method according to an embodiment of this application.

The model training method in this application is described below with reference to the foregoing description. Referring to FIG. 6, an embodiment of the model training method in this application includes the following steps:

601. The computer device obtains a first to-be-trained video, a second to-be-trained video, a first to-be-trained text, and a second to-be-trained text, the first to-be-trained video having a matching relationship with the first to-be-trained text, the first to-be-trained video having no matching relationship with the second to-be-trained text, the second to-be-trained video having a matching relationship with the second to-be-trained text, and the second to-be-trained video having no matching relationship with the first to-be-trained text.

In this embodiment, the model training apparatus first obtains the first to-be-trained video, the second to-be-trained video, the first to-be-trained text, and the second to-be-trained text. There are two pairs of matched training objects and two pairs of unmatched training objects. That is, the first to-be-trained video matches the first to-be-trained text, the second to-be-trained video matches the second to-be-trained text, the first to-be-trained video does not match the second to-be-trained text, and the second to-be-trained video does not match the first to-be-trained text.

602. The computer device determines a permutation loss function according to the first to-be-trained video, the second to-be-trained video, the first to-be-trained text, and the second to-be-trained text, the permutation loss function being configured to process the first to-be-trained video and the second to-be-trained text and process the second to-be-trained video and the first to-be-trained text.

In this embodiment, the model training apparatus uses the first to-be-trained video and the first to-be-trained text as positive samples, uses the second to-be-trained video and the second to-be-trained text as positive samples, uses the first to-be-trained video and the second to-be-trained text as negative samples, uses the second to-be-trained video and the first to-be-trained text as negative samples, and further obtains a matching score of the positive samples and a matching score of the negative samples. The permutation loss function is constructed according to a magnitude relationship between the matching score of the positive samples and the matching score of the negative samples.

603. The computer device determines a diversity loss function according to the first to-be-trained video, the second to-be-trained video, the first to-be-trained text, and the second to-be-trained text, the diversity loss function being configured to process the first to-be-trained video and the first to-be-trained text and process the second to-be-trained video and the second to-be-trained text.

In this embodiment, the model training apparatus uses the first to-be-trained video and the first to-be-trained text as the positive samples, uses the second to-be-trained video and the second to-be-trained text as the positive samples, and may select data corresponding to any one positive sample to construct the diversity loss function. In the positive sample, it is necessary to enable that different spatiotemporal candidate regions have different matching scores. That is, score distributions of the entire spatiotemporal distribution region are diverse and not equal. In this way, a more accurate matching effect can be achieved.

604. The computer device determines a target loss function according to the permutation loss function and the diversity loss function.

In this embodiment, the model training apparatus combines the permutation loss function with the diversity loss function, to generate the target loss function.

605. The computer device trains a to-be-trained interactor by using the target loss function, to obtain the attention-based interactor, the interactor being configured to output a matching score between the to-be-matched video and the to-be-matched text.

In this embodiment, the model training apparatus of the computer device trains a to-be-trained video text interaction model by using the target loss function that has been constructed, to obtain the video text interaction model. After feature processing is performed on the to-be-matched video and the to-be-matched text, the to-be-matched video and the to-be-matched text are inputted to the video text interaction model, to obtain matching scores of the spatiotemporal candidate regions in the video, and finally the spatiotemporal candidate region that has the highest matching score is selected as the target spatiotemporal candidate region.

The loss function is generally used as a learning criterion, and is related to an optimization problem. That is, the model is solved and evaluated by minimizing the loss function.

The embodiments of this application provide a model training method. A first to-be-trained video, a second to-be-trained video, a first to-be-trained text, and a second to-be-trained text are first obtained. The first to-be-trained video matches the first to-be-trained text, the first to-be-trained video does not match the second to-be-trained text, the second to-be-trained video matches the second to-be-trained text, and the second to-be-trained video does not match the first to-be-trained text. A permutation loss function and a diversity loss function are then determined according to the first to-be-trained video, the second to-be-trained video, the first to-be-trained text, and the second to-be-trained text. The model is finally trained by combining the permutation loss function with the diversity loss function, to obtain the video text interaction model. By means of the above method, the model is trained by using both the permutation loss function and the diversity loss function, so as to improve the accuracy of matching between the text and different spatiotemporal candidate regions, thereby helping improve the precision of model training.

In some embodiments, based on the foregoing embodiment corresponding to FIG. 6, the model training method provided in this embodiment of this application further includes an optional embodiment. In the optional embodiment, in the foregoing step 602, the determining a permutation loss function according to the first to-be-trained video, the second to-be-trained video, the first to-be-trained text, and the second to-be-trained text may include:

obtaining a first spatiotemporal candidate region set in the first to-be-trained video, and obtaining a second spatiotemporal candidate region set in the second to-be-trained video, the first spatiotemporal candidate region set including at least one first spatiotemporal candidate region, the first spatiotemporal candidate region being a video sequence, the second spatiotemporal candidate region set including at least one second spatiotemporal candidate region, and the second spatiotemporal candidate region being a video sequence;

calculating a first matching score according to the first to-be-trained text and the second spatiotemporal candidate region set;

calculating a second matching score according to the second to-be-trained text and the first spatiotemporal candidate region set;

calculating a third matching score according to the first to-be-trained text and the first spatiotemporal candidate region set; and determining the permutation loss function according to the first matching score, the second matching score, and the third matching score.

In this embodiment, content of the permutation loss function is described. First, the model training apparatus separately extracts the spatiotemporal candidate regions from the first to-be-trained video and the second to-be-trained video. The extraction manner is as the content described in the foregoing first optional embodiment corresponding to FIG. 3. Based on the foregoing manners, a first spatiotemporal candidate region set corresponding to the first to-be-trained video may be obtained. The first spatiotemporal candidate region set includes at least one first spatiotemporal candidate region. In addition, a second spatiotemporal candidate region set corresponding to the second to-be-trained video is obtained. The second spatiotemporal candidate region set includes at least one second spatiotemporal candidate region. If the first to-be-trained video is v, and the first to-be-trained text is q, a matching score $S(v, q)$ between the first to-be-trained video and the first to-be-trained text is defined as:

$$S(v,q) = \max_i s(q, p_i), i = 1, \ldots, N,$$

$p_i$ representing an $i^{th}$ first spatiotemporal candidate region in the first spatiotemporal candidate region set, N representing a total quantity of first spatiotemporal candidate regions in the first to-be-trained video, $\max_i(\ )$ representing obtaining a maximum value, and $s(q, p_i)$ representing a matching behavior modeling between the $i^{th}$ first spatiotemporal candidate region $p_i$ and the inputted first to-be-trained text q. $S(v, q)$ may be represented as the third matching score.

Similarly, if the second to-be-trained video is v', and the first to-be-trained text is q, a matching score $S(v', q)$ between the second to-be-trained video and the first to-be-trained text is defined as:

$$S(v',q) = \max_i s(q, p'_i), i = 1, \ldots, N,$$

$p'_i$ representing an $i^{th}$ second spatiotemporal candidate region in the second spatiotemporal candidate region set, N representing a total quantity of second spatiotemporal candidate regions in the second to-be-trained video, $\max_i(\ )$ representing obtaining a maximum value, and $s(q, p'_i)$ representing a matching behavior modeling between the $i^{th}$ second spatiotemporal candidate region $p_i$, and the inputted first to-be-trained text q. $S(v', q)$ may be represented as the first matching score.

Similarly, if the first to-be-trained video is v, and the second to-be-trained text is q', a matching score $S(v, q')$ between the first to-be-trained video and the second to-be-trained text is defined as:

$$S(v,q') = \max_i s(q', p_i), i = 1, \ldots, N,$$

$p_i$ representing an $i^{th}$ first spatiotemporal candidate region in the first spatiotemporal candidate region set, N representing a total quantity of first spatiotemporal candidate regions in the first to-be-trained video, $\max_i(\ )$ representing obtaining a maximum value, and $s(q', p_i)$ representing a matching behavior modeling between the $i^{th}$ first spatiotemporal candidate region $p_i$ and the inputted second to-be-trained text q'. $S(v, q')$ may be represented as the second matching score.

The permutation loss function as follows may be obtained based on the first matching score, the second matching score, and the third matching score obtained through calculation:

$$L_{rank} = \tau_{v=v'} \Sigma_{q=q'} [\max(0, S(v,q') - S(v,q) + \Delta) + \max(0, S(v', q) - S(v,q) + \Delta)]$$

$\Delta$ representing a constant. The permutation loss function $L_{rank}$ can directly cause the third matching score $S(v, q)$ of the positive samples to be greater than the second matching score $S(v, q')$ and the first matching score $S(v', q)$ of the negative samples. Therefore, it can help generate a strong matching behavior $s(q, p^*)$ between the target spatiotemporal candidate region $p^*$ and the first to-be-trained text q.

Further, the embodiments of this application further provide a manner of determining the permutation loss function. That is, the model training apparatus first obtains a first spatiotemporal candidate region set in the first to-be-trained video, and obtains a second spatiotemporal candidate region set in the second to-be-trained video, the first spatiotemporal candidate region set including at least one first spatiotemporal candidate region, the first spatiotemporal candidate region being a video sequence, the second spatiotemporal candidate region set including at least one second spatiotemporal candidate region, and the second spatiotemporal candidate region being a video sequence; and then separately calculates a first matching score according to the first to-be-trained text and the second spatiotemporal candidate region set, calculates a second matching score according to the second to-be-trained text and the first spatiotemporal candidate region set, calculates a third matching score according to the first to-be-trained text and the first spatiotemporal candidate region set, and determines the permutation loss function according to the first matching score, the second matching score, and the third matching score. By means of the above method, the permutation loss function obtained through design can cause the matching score of the matched data to be greater than a matching score of unmatched data, so that a strong matching relationship is generated between the target spatiotemporal candidate region and the text. The permutation loss function may contribute to distinguishing whether the video matches the text.

In some embodiments, based on the foregoing embodiment corresponding to FIG. 6, the model training method provided in this embodiment of this application further includes another optional embodiment. In the optional embodiment, in the foregoing step 603, the determining a diversity loss function according to the first to-be-trained video, the second to-be-trained video, the first to-be-trained text, and the second to-be-trained text may include:

determining a matching behavior distribution according to a first spatiotemporal candidate region set and the first to-be-trained text, the first spatiotemporal candidate region set being generated according to the first to-be-trained video, and the matching behavior distribution representing a matching relationship between each first spatiotemporal candidate region in the first spatiotemporal candidate region set and the first to-be-trained text; performing normalization processing on the matching behavior distribution, to obtain a target matching behavior distribution; and determining the diversity loss function according to the target matching behavior distribution.

In this embodiment, content of the diversity loss function is described. It can be learned based on the prior experience, when sentences expressed in a natural language are positioned in a video, only a small part of spatiotemporal candidate regions have a semantic pairing relationship with input sentences. This is because a reasonable matching behavior distribution $\{s(q, p_n)\}_{n=1}^{N}$ is diverse. That is, only a small part of matching behaviors between the spatiotemporal candidate regions and the text are strong matching behaviors, and matching behaviors of other spatiotemporal candidate regions are weak.

To make the generated matching behavior distribution $\{s(q, p_n)\}_{n=1}^{N}$ has diversity, the diversity loss function is introduced. First, the model training apparatus extracts the spatiotemporal candidate regions from the first to-be-trained video. The extraction manner is as the content described in the foregoing first optional embodiment corresponding to FIG. 3. Based on the foregoing manners, a spatiotemporal candidate region set corresponding to the first to-be-trained video may be obtained. The spatiotemporal candidate region set includes at least one spatiotemporal candidate region. If the first to-be-trained video is v, the first to-be-trained text is q. In this case, in this solution, the matching behavior distribution $\{s(q, p_n)\}_{n=1}^{N}$ is first normalized by using a softmax function. That is, calculation is performed in the following manners:

$$s'(q, p_k) = \frac{\exp(s(q, p_k))}{\sum_{n=1}^{N} \exp(s'(q, p_k))}.$$

$p_k$ is any one of $p_n$, and $p_k$ represents a $k^{th}$ spatiotemporal candidate region, and then punishes a $\{s'(q,p_n)\}_{n=1}^{N}$ distributed information entropy. The function is to strengthen a matching relationship between the spatiotemporal candidate region that has a relatively high confidence and the text and also weaken a matching relationship between the spatiotemporal candidate region that has a relatively low confidence and the text. The diversity loss function is finally obtained as follows:

$$L_{div} = -\sum_{n=1}^{N} s'(q, p_n) \log(s'(q, p_n)),$$

$L_{div}$ representing the diversity loss function.

Further, the embodiments of this application further provide a manner of determining the diversity loss function. That is, the model training apparatus may determine a matching behavior distribution according to the first spatiotemporal candidate region set and the first to-be-trained text, then perform normalization processing on the matching behavior distribution, to obtain a target matching behavior distribution, and finally determine the diversity loss function according to the target matching behavior distribution. By means of the above method, the diversity loss function obtained through design can not only strengthen the matching relationship between the spatiotemporal candidate region that has a relatively high confidence and the text, but also weaken the matching relationship between the spatiotemporal candidate region that has a relatively low confidence and the text. Therefore, an actual matching relationship between the spatiotemporal candidate region and the text is closer, thereby helping obtain a more accurate network model through calculation.

In some embodiments, based on FIG. 6 and the two optional embodiments corresponding to FIG. 6, the model training method provided in this embodiment of this application further includes still another optional embodiment. In the optional embodiment, in the foregoing step 604, the determining a target loss function according to the permutation loss function and the diversity loss function may include:

determining the target loss function in the following manners:

$$L = L_{rank} + \beta L_{div},$$

L representing the target loss function, $L_{rank}$ representing the permutation loss function, $L_{div}$ representing a diversity loss function, and β representing a control coefficient.

In this embodiment, an implementation of generating the target loss function is described. After obtaining the permutation loss function and the diversity loss function, the model training apparatus adds the permutation loss function and the diversity loss function, and also adds a coefficient to the diversity loss function. Details are as follows:

$$L = L_{rank} + \beta L_{div}.$$

β may be set to 0.5, or may be set to another reasonable value. This is not limited herein.

That is, the computer device obtains a control coefficient, and determines the target loss function according to the control coefficient, the permutation loss function, and the diversity loss function.

Still, the embodiments of this application further provide an implementation of determining the target loss function. That is, the permutation loss function that is designed already is combined with the diversity loss function. According to the foregoing manners, the target loss function obtained through design can not only distinguish between a matched video and a sentence pair and an unmatched video and a sentence pair, but also can strengthen a matching relationship between the spatiotemporal candidate region that has a high confidence and the sentences in the matched video and the sentence pair, and also weaken a matching relationship between the spatiotemporal candidate region that has a low confidence and the sentences, thereby improving the reliability of model training, so that the more accurate network model is obtained.

Figure 7:
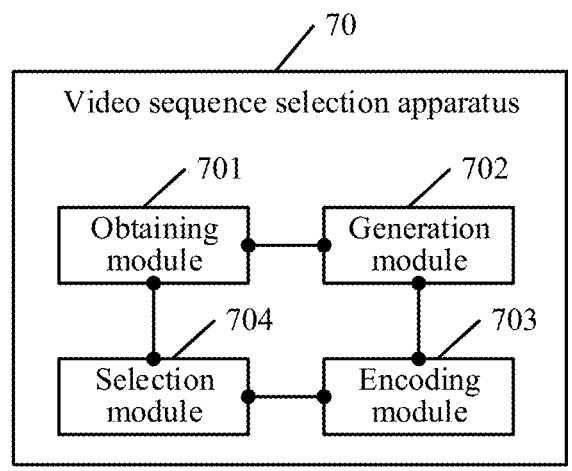
FIG. 7 is a schematic diagram of an embodiment of a video sequence selection apparatus according to an embodiment of this application.

A video sequence selection apparatus in this application is described below in detail. FIG. 7 is a schematic diagram of an embodiment of a video sequence selection apparatus according to an embodiment of this application. The video sequence selection apparatus 70 includes:

- an obtaining module 701, configured to receive a to-be-matched video and a to-be-matched text, the to-be-matched video including a plurality of frames, the to-be-matched text including at least one word, and the to-be-matched text having a to-be-matched text feature sequence;
- a generation module 702, configured to invoke a spatiotemporal candidate region generator to extract a spatiotemporal candidate region set from the to-be-matched video, the spatiotemporal candidate region set including N spatiotemporal candidate regions, N being an integer greater than or equal to 1, and each spatiotemporal candidate region corresponding to a respective video sequence in the to-be-matched video;
- an encoding module 703, configured to perform feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set,
- the obtaining module 701 being further configured to invoke an attention-based interactor to obtain a matching score corresponding to each spatiotemporal candidate region, the interactor being configured to process the to-be-matched video feature sequence and the to-be-matched text feature sequence, and the matching score being used for representing a matching relationship between the spatiotemporal candidate region and the to-be-matched text; and
- a selection module 704, configured to: select from the spatiotemporal candidate region set, a target spatiotemporal candidate region having a highest matching score outputted by the interactor, and output the target spatiotemporal candidate region.

The embodiments of this application provide a video sequence selection apparatus. A to-be-matched video and a to-be-matched text are first received, the to-be-matched video including a plurality of frames, the to-be-matched text including at least one word, and the to-be-matched text having a to-be-matched text feature sequence. A spatiotemporal candidate region set is then extracted from the to-be-matched video. Feature extraction needs to be next performed on each spatiotemporal candidate region in the spatiotemporal candidate region set, to obtain N to-be-matched video feature sequences, each to-be-matched video feature sequence corresponding to a respective spatiotemporal candidate region in the spatiotemporal candidate region set. An attention-based interactor may be then invoked to obtain a matching score corresponding to each spatiotemporal candidate region. A target spatiotemporal candidate region is finally selected from the spatiotemporal candidate region set according to the matching score corresponding to each spatiotemporal candidate region, each spatiotemporal candidate region corresponding to a respective video sequence in the to-be-matched video. By means of the above method, the spatiotemporal candidate region in a video is matched with the text, instead of matching each frame in the video with the text. The advantage of this operation is that, because the spatiotemporal candidate region includes a relationship between image in time and space, a temporal association between a video and a text is considered during matching, that is, the influence of video temporal information on the video sequence and the text is considered, thereby increasing the degree of matching between the outputted video sequence and the text, facilitating a better understanding of video content.

In some embodiments, based on the foregoing embodiment corresponding to FIG. 7, in another optional embodiment of the video sequence selection apparatus 70 provided in this embodiment of this application, the generation module 702 is configured to: invoke the spatiotemporal candidate region generator to obtain a candidate region and a confidence score of each frame in the to-be-matched video, each candidate region corresponding to a respective confidence score; obtain a degree of overlap between every two adjacent frames in the to-be-matched video; and generate the spatiotemporal candidate region set according to the candidate region and the confidence score of each frame and the overlap degrees.

In some embodiments, based on the foregoing embodiment corresponding to FIG. 7, in another optional embodiment of the video sequence selection apparatus 70 provided in this embodiment of this application, The obtaining module 701 is configured to: invoke, for each spatiotemporal candidate region, an encoder of the interactor to encode the to-be-matched video feature sequence corresponding to the spatiotemporal candidate region, to obtain a visual feature set, the visual feature set including at least one visual feature; invoke the encoder of the interactor to encode the to-be-matched text feature sequence, to obtain a text feature set, the text feature set including at least one text feature; determine a visual text feature set according to the visual feature set and the text feature set, the visual text feature set including at least one visual text feature, the visual text feature representing a visual feature-based text feature; and determine the matching score corresponding to the spatiotemporal candidate region according to the visual text feature set and the visual feature set.

In some embodiments, based on the foregoing embodiment corresponding to FIG. 7, in another optional embodiment of the video sequence selection apparatus 70 provided in this embodiment of this application, the obtaining module 701 is configured to: calculate the visual feature set in the following manner:

$$H_p = \{h_t^p\}_{t=1}^{t_p}, \text{ and}$$

$$h_t^p = \text{LSTM}_p(f_t^p, h_{t-1}^p),$$

$H_p$ representing the visual feature set, $h_t^p$ representing a $t^{th}$ visual feature in the visual feature set, $t_p$ representing a time step in the spatiotemporal candidate region, $h_{t-1}^p$ representing a $(t-1)^{th}$ visual feature in the visual feature set, $\text{LSTM}_p(\ )$ representing a first long short-term memory LSTM network encoder, and $f_t^p$ representing a $t^{th}$ row of features in the to-be-matched video feature sequence; and calculate the text feature set in the following manner:

$$H_q = \{h_t^q\}_{t=1}^{t_q}, \text{ and}$$

$$h_t^q = \text{LSTM}_q(f_t^q, h_{t-1}^q),$$

$H_q$ representing the text feature set, $h_t^q$ representing a $t^{th}$ text feature in the text feature set, $t_q$ representing a word quantity of the to-be-matched text, $h_{t-1}^q$ representing a $(t-1)^{th}$ text feature in the text feature set, $\text{LSTM}_q(\ )$ representing a second LSTM encoder, and $f_t^q$ representing a $t^{th}$ row of features in the to-be-matched text feature sequence.

In some embodiments, based on the foregoing embodiment corresponding to FIG. 7, in another optional embodiment of the video sequence selection apparatus 70 provided in this embodiment of this application, the obtaining module 701 is configured to: invoke the interactor to obtain an attention weight of the text feature corresponding to the visual feature according to the visual feature set and the text feature set; obtain a normalized attention weight of the text feature corresponding to the visual feature according to the attention weight; and obtain the visual text feature set according to the normalized attention weight and the text feature.

In some embodiments, based on the foregoing embodiment corresponding to FIG. 7, in another optional embodiment of the video sequence selection apparatus 70 provided in this embodiment of this application, the obtaining module 701 is configured to: calculate the attention weight in the following manner:

$$e_{i,j}=w^T\tanh(W^q h_j^q + W^p h_i^p + b_1) + b_2,$$

$e_{i,j}$ representing an attention weight of a $j^{th}$ text feature corresponding to an $i^{th}$ visual feature, $h_j^q$ representing the $j^{th}$ text feature, $h_i^p$ representing the $i^{th}$ visual feature, $W^T$ representing a first model parameter, $W^q$ representing a second model parameter, $W^p$ representing a third model parameter, $b_1$ representing a fourth model parameter, $b_2$ representing a fifth model parameter, and tanh( ) representing a hyperbolic tangent function;

calculate the normalized attention weight in the following manner:

$$a_{i,j} = \frac{\exp(e_{i,j})}{\sum_{k=1}^{t_q}\exp(e_{i,k})},$$

$a_{i,j}$ representing a normalized attention weight of the $j^{th}$ text feature corresponding to the $i^{th}$ visual feature, $t_q$ representing a word quantity of the to-be-matched text, k representing a $k^{th}$ word in the to-be-matched text, k being an integer greater than or equal to 1 and less than or equal to $t_q$, and exp( ) representing an exponential function; and calculate the visual text feature set in the following manner:

$$H_{qp}=\{h_{qp}\}_{t=1}^{t_p}; \text{ and}$$

$$h_{qp} = \sum_{j=1}^{t_q} a_{i,j} h_j^q,$$

$H_{qp}$ representing the visual text feature set, $t_p$ representing a time step of the spatiotemporal candidate region, and $h_{qp}$ representing the visual text feature.

In some embodiments, based on the foregoing embodiment corresponding to FIG. 7, in another optional embodiment of the video sequence selection apparatus 70 provided in this embodiment of this application, the obtaining module 701 is configured to calculate the matching score in the following manner:

$$s(q, p) = \frac{1}{t_p}\sum_{i=1}^{t_p} s_i(h_i^p, h_i^{qp}); \text{ and}$$

$$s_i(h_i^p, h_i^{qp})=\phi(h_i^p, h_i^{qp}),$$

s(q, p) representing the matching score corresponding to the spatiotemporal candidate region, $s_i(h_i^p, h_i^{qp})$ representing a matching subscore between a visual feature and a visual text feature that correspond to an $i^{th}$ time step, $h_i^{qp}$ representing the visual text feature corresponding to the $i^{th}$ time step, $h_i^p$ representing the visual feature corresponding to the $i^{th}$ time step, and $\phi( )$ representing a similarity calculation function.

Figure 8:
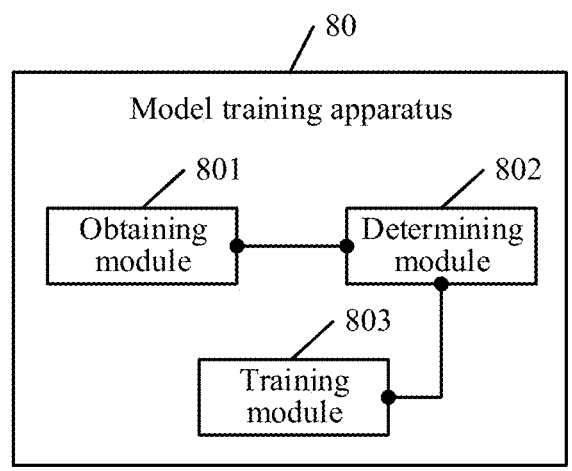
FIG. 8 is a schematic diagram of an embodiment of a model training apparatus according to an embodiment of this application.

A model training apparatus in this application is described below in detail. FIG. 8 is a schematic diagram of an embodiment of a model training apparatus according to an embodiment of this application. The model training apparatus 80 includes:

an obtaining module 801, configured to obtain a first to-be-trained video, a second to-be-trained video, a first to-be-trained text, and a second to-be-trained text, the first to-be-trained video having a matching relationship with the first to-be-trained text, the first to-be-trained video having no matching relationship with the second to-be-trained text, the second to-be-trained video having a matching relationship with the second to-be-trained text, and the second to-be-trained video having no matching relationship with the first to-be-trained text;

a determining module 802, configured to determine a permutation loss function according to the first to-be-trained video, the second to-be-trained video, the first to-be-trained text, and the second to-be-trained text that are obtained by the obtaining module 801, the permutation loss function being configured to process the first to-be-trained video and the second to-be-trained text and process the second to-be-trained video and the first to-be-trained text, the determining module 802 being further configured to determine a diversity loss function according to the first to-be-trained video, the second to-be-trained video, the first to-be-trained text, and the second to-be-trained text that are obtained by the obtaining module 801, the diversity loss function being configured to process the first to-be-trained video and the first to-be-trained text and process the second to-be-trained video and the second to-be-trained text; and the determining module 802 being further configured to determine a target loss function according to the permutation loss function and the diversity loss function; and a training module 803, configured to train a to-be-trained interactor by using the target loss function determined by the determining module 802, to obtain the attention-based interactor, the interactor being configured to output a matching score between the to-be-matched video and the to-be-matched text.

In this embodiment of this application, a model training apparatus is provided. A first to-be-trained video, a second to-be-trained video, a first to-be-trained text, and a second to-be-trained text are first obtained. The first to-be-trained video matches the first to-be-trained text, the first to-be-trained video does not match the second to-be-trained text, the second to-be-trained video matches the second to-be-trained text, and the second to-be-trained video does not match the first to-be-trained text. A permutation loss function and a diversity loss function are then determined according to the first to-be-trained video, the second to-be-trained video, the first to-be-trained text, and the second to-be-trained text. The model is finally trained by combining the permutation loss function with the diversity loss function, to obtain the attention-based interactor. According to the foregoing manners, that the model is trained by using both the permutation loss function and the diversity loss function can not only improve the accuracy of matching between the text and different spatiotemporal candidate regions, but also improve the accuracy of matching between the text and the candidate regions, thereby helping improve the precision of model training.

In some embodiments, based on the foregoing embodiment corresponding to FIG. 8, in another optional embodiment of the model training apparatus 80 provided in this embodiment of this application, the determining module 802 is configured to: obtain a first spatiotemporal candidate region set in the first to-be-trained video, and obtain a second spatiotemporal candidate region set in the second to-be-trained video, the first spatiotemporal candidate region set including at least one first spatiotemporal candidate region, the first spatiotemporal candidate region being a video sequence, the second spatiotemporal candidate region set including at least one second spatiotemporal candidate region, and the second spatiotemporal candidate region being a video sequence; calculate a first matching score according to the first to-be-trained text and the second spatiotemporal candidate region set; calculate a second matching score according to the second to-be-trained text and the first spatiotemporal candidate region set; calculate a third matching score according to the first to-be-trained text and the first spatiotemporal candidate region set; and determine the permutation loss function according to the first matching score, the second matching score, and the third matching score.

In some embodiments, based on the foregoing embodiment corresponding to FIG. 8, in another optional embodiment of the model training apparatus 80 provided in this embodiment of this application, the determining module 802 is configured to: determine a matching behavior distribution according to a first spatiotemporal candidate region set and the first to-be-trained text, the first spatiotemporal candidate region set being generated according to the first to-be-trained video, and the matching behavior distribution representing a matching relationship between each first spatiotemporal candidate region in the first spatiotemporal candidate region set and the first to-be-trained text; perform normalization processing on the matching behavior distribution, to obtain a target matching behavior distribution; and determine the diversity loss function according to the target matching behavior distribution.

In some embodiments, based on the foregoing embodiment corresponding to FIG. 8, in another optional embodiment of the model training apparatus 80 provided in this embodiment of this application, the determining module 802 is configured to: obtain a control coefficient, and determine the target loss function according to the control coefficient, the permutation loss function, and the diversity loss function.

Figure 9:
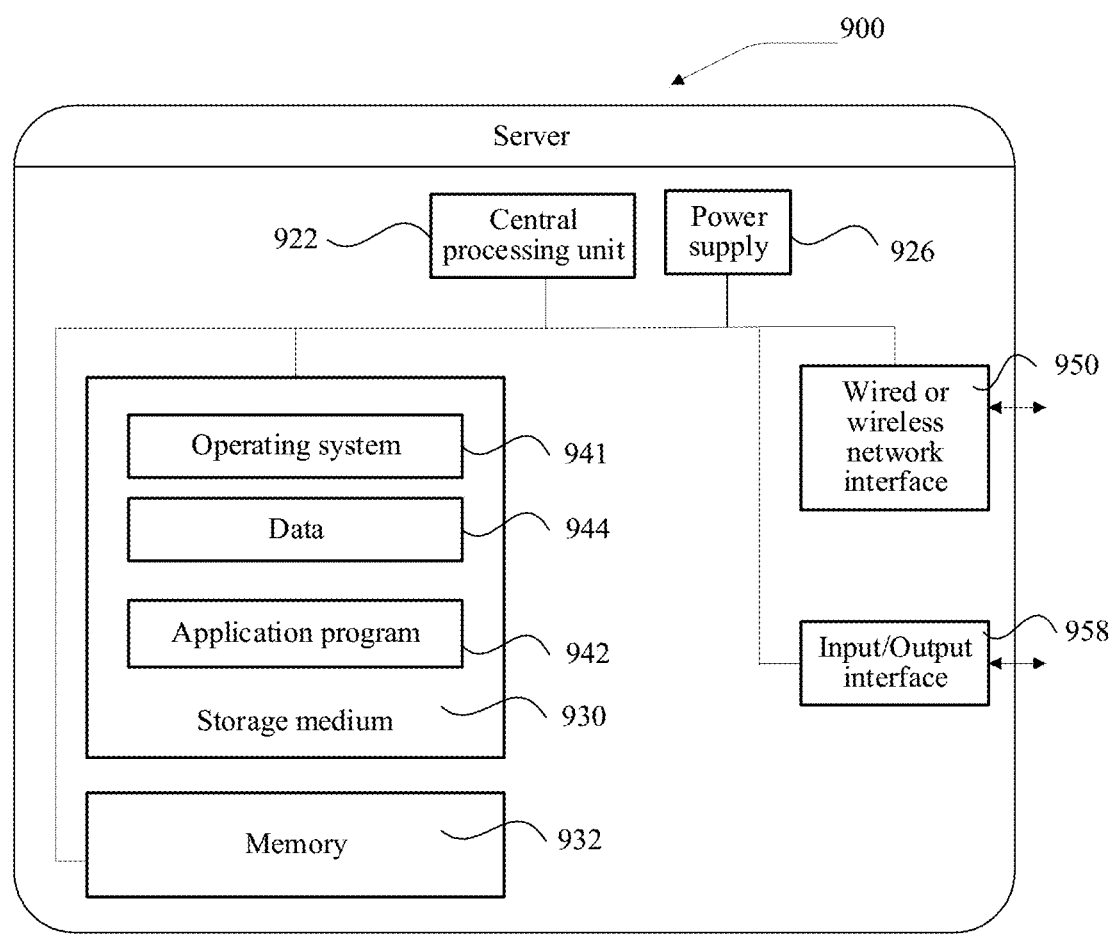
FIG. 9 is a schematic structural diagram of a server according to an embodiment of this application.

FIG. 9 is a schematic structural diagram of a server according to an embodiment of the present application. The server 900 may vary greatly due to different configurations or performance, and may include one or more central processing units (CPUs) 922 (for example, one or more processors) and a memory 932, and one or more storage media 930 (for example, one or more mass storage devices) that store an application program 942 or data 944. The memory 932 and the storage medium 930 may implement transient storage or permanent storage. A program stored in the storage medium 930 may include one or more modules (not shown in the figure), and each module may include a series of instruction operations on the server. Further, the CPU 922 may be configured to communicate with the storage medium 930, and perform, on the server 900, the series of instruction operations in the storage medium 530.

The server 900 may further include one or more power supplies 926, one or more wired or wireless network interfaces 950, one or more input/output interfaces 958, and/or one or more operating systems 941 such as Windows Server™, Mac OS X™, Unix™, Linux™ or FreeBSD™.

The steps performed by the server in the foregoing embodiments may be based on the server structure shown in FIG. 9.

In this embodiment of this application, the CPU 922 in the server may be configured to perform the video sequence selection method and the model training method provided in the foregoing embodiments.

A person skilled in the art can clearly understand that for convenience and conciseness of description, for specific working processes of the foregoing described system, apparatus and unit, refer to the corresponding processes in the foregoing method embodiments, and details are not described herein again.

In the several embodiments provided in this application, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of this application.

What is claimed is:

1. A video sequence selection method, applicable to a computer device, the method comprising:
receiving, by the computer device, a to-be-matched video and a to-be-matched text, wherein the to-be-matched text is not part of the to-be-matched video, the to-be-matched video comprising a plurality of frames, the to-be-matched text comprising at least one word, and the to-be-matched text having a to-be-matched text feature sequence corresponding to a target object;
invoking, by the computer device, a spatiotemporal candidate region generator to extract a spatiotemporal candidate region set from the to-be-matched video, the spatiotemporal candidate region set comprising N spatiotemporal candidate regions, N being an integer greater than or equal to 1, and each spatiotemporal candidate region corresponding to images within a respective video sequence in the to-be-matched video that include a candidate object;
performing, by the computer device, feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set and representing a respective candidate object in the respective spatiotemporal candidate region;
invoking, by the computer device, an attention-based interactor to obtain a matching score corresponding to each spatiotemporal candidate region, the interactor being configured to process the to-be-matched video feature sequence and the to-be-matched text feature sequence, and the matching score being used for representing a matching relationship between a respective candidate object in the spatiotemporal candidate region and the target object corresponding to the to-be-matched text; and
selecting, by the computer device, from the spatiotemporal candidate region set, a target spatiotemporal candidate region having a highest matching score outputted by the interactor, and outputting the target spatiotemporal candidate region as representing the target object corresponding to the to-be-matched text.

2. The method according to claim 1, wherein the invoking, by the computer device, a spatiotemporal candidate region generator to extract a spatiotemporal candidate region set from the to-be-matched video comprises:
invoking, by the computer device, the spatiotemporal candidate region generator to obtain a candidate region and a confidence score of each frame in the to-be-matched video, each candidate region corresponding to a respective confidence score;
invoking, by the computer device, the spatiotemporal candidate region generator to obtain a degree of overlap of similar image content between every two adjacent frames in the to-be-matched video; and invoking, by the computer device, the spatiotemporal candidate region generator to generate the spatiotemporal candidate region set according to the candidate region and the confidence score of each frame and the overlap degrees.

3. The method according to claim 1, wherein the invoking, by the computer device, an attention-based interactor to obtain a matching score corresponding to each spatiotemporal candidate region comprises:
invoking, by the computer device for each spatiotemporal candidate region, an encoder of the interactor to encode the to-be-matched video feature sequence corresponding to the spatiotemporal candidate region, to obtain a visual feature set, the visual feature set comprising at least one visual feature of a candidate object in the spatiotemporal candidate region;
invoking, by the computer device, the encoder of the interactor to encode the to-be-matched text feature sequence, to obtain a text feature set, the text feature set comprising at least one text feature of the target object;
invoking, by the computer device, the interactor to determine a visual text feature set according to the visual feature set and the text feature set, the visual text feature set comprising at least one visual text feature, the visual text feature representing a visual feature-based text feature; and
invoking, by the computer device, the interactor to determine the matching score corresponding to the candidate object in the spatiotemporal candidate region and the target object according to the visual text feature set and the visual feature set.

4. The method according to claim 3, wherein the invoking, by the computer device, an encoder of the interactor to encode the to-be-matched video feature sequence corresponding to the spatiotemporal candidate region, to obtain a visual feature set comprises:
calculating the visual feature set in the following manner:

$$H_p = \{h_t^p\}_{t=1}^{t_p}, \text{ and}$$

$$h_t^p = LSTM_p(f_t^p, h_{t-1}^p),$$

$H_p$ representing the visual feature set, $h_t^p$ representing a $t^{th}$ visual feature in the visual feature set, $t_p$ representing a time step in the spatiotemporal candidate region, $h_{t-1}^p$ representing a $(t-1)^{th}$ visual feature in the visual feature set, $LSTM_p(\ )$ representing a first long short-term memory (LSTM) network encoder, and $f_t^p$ representing a $t^{th}$ row of features in the to-be-matched video feature sequence; and the invoking, by the computer device, the encoder of the interactor to encode the to-be-matched text feature sequence, to obtain a text feature set comprises:
calculating the text feature set in the following manner:

$$H_q = \{h_t^q\}_{t=1}^{t_q}, \text{ and}$$

$$h_t^q = LSTM_q(f_t^q, h_{t-1}^q),$$

$H_q$ representing the text feature set, $h_t^q$ representing a $t^{th}$ text feature in the text feature set, $t_q$ representing a word quantity of the to-be-matched text, $h_{t-1}^q$ representing a $(t-1)^{th}$ text feature in the text feature set, $LSTM_q(\ )$ representing a second LSTM encoder, and $f_t^q$ representing a $t^{th}$ row of features in the to-be-matched text feature sequence.

5. The method according to claim 3, wherein the invoking, by the computer device, the interactor to determine a visual text feature set according to the visual feature set and the text feature set comprises:
- invoking, by the computer device, the interactor to calculate an attention weight of the text feature corresponding to the visual feature according to the visual feature set and the text feature set;
- invoking, by the computer device, the interactor to calculate a normalized attention weight of the text feature corresponding to the visual feature according to the attention weight; and
- invoking, by the computer device, the interactor to calculate the visual text feature set according to the normalized attention weight and the text feature.

6. The method according to claim 5, wherein the invoking, by the computer device, the interactor to calculate an attention weight of the text feature corresponding to the visual feature according to the visual feature set and the text feature set comprises:
calculate the attention weight in the following manner:

$$e_{i,j} = w^T \tanh(W^q h_j^q + W^p h_i^p + b_1) + b_2;$$

$e_{i,j}$ representing an attention weight of a $j^{th}$ text feature corresponding to an $i^{th}$ visual feature, $h_j^q$ representing the $j^{th}$ text feature, $h_i^p$ representing the $i^{th}$ visual feature, $W^T$ representing a first model parameter, $W^q$ representing a second model parameter, $W^p$ representing a third model parameter, $b_1$ representing a fourth model parameter, $b_2$ representing a fifth model parameter, and tanh( ) representing a hyperbolic tangent function;

the invoking, by the computer device, the interactor to calculate a normalized attention weight of the text feature corresponding to the visual feature according to the attention weight comprises:
calculate the normalized attention weight in the following manner:

$$a_{i,j} = \frac{\exp(e_{i,j})}{\sum_{k=1}^{t_q} \exp(e_{i,k})},$$

$a_{i,j}$ representing a normalized attention weight of the $j^{th}$ text feature corresponding to the $i^{th}$ visual feature, $t_q$ representing a word quantity of the to-be-matched text, k representing a $k^{th}$ word in the to-be-matched text, k being an integer greater than or equal to 1 and less than or equal to $t_q$, and exp( ) representing an exponential function; and the invoking, by the computer device, the interactor to calculate the visual text feature set according to the normalized attention weight and the text feature comprises:
calculating the visual text feature set in the following manner:

$$H_{qp} = \{h_{qp}\}_{t=1}^{t_p}; \text{ and}$$

$$h_{qp} = \sum_{j=1}^{t_q} a_{i,j} h_j^q,$$

$H_{qp}$ representing the visual text feature set, $t_p$ representing a time step of the spatiotemporal candidate region, and $h_{qp}$ representing the visual text feature.

7. The method according to claim 3, wherein the invoking, by the computer device, the interactor to determine the matching score corresponding to the spatiotemporal candidate region according to the visual text feature set and the visual feature set comprises:
calculating the matching score in the following manner:

$$s(q, p) = \frac{1}{t_p} \sum_{i=1}^{t_p} s_i(h_i^p, h_i^{qp}); \text{ and}$$

$$s_i(h_i^p, h_i^{qp}) = \phi(h_i^p, h_i^{qp}),$$

s(q, p) representing the matching score corresponding to the spatiotemporal candidate region, $s_i(h_i^p, h_i^{qp})$ representing a matching subscore between a visual feature and a visual text feature that correspond to an $i^{th}$ time step, $h_i^{qp}$ representing the visual text feature corresponding to the $i^{th}$ time step, $h_i^p$ representing the visual feature corresponding to the $i^{th}$ time step, and $\phi( )$ representing a similarity calculation function.

8. The method according to claim 1, further comprising:
- obtaining, by the computer device, a first to-be-trained video, a second to-be-trained video, a first to-be-trained text, and a second to-be-trained text, the first to-be-trained video having a matching relationship with the first to-be-trained text, the first to-be-trained video having no matching relationship with the second to-be-trained text, the second to-be-trained video having a matching relationship with the second to-be-trained text, and the second to-be-trained video having no matching relationship with the first to-be-trained text;
- determining, by the computer device, a permutation loss function according to the first to-be-trained video, the second to-be-trained video, the first to-be-trained text, and the second to-be-trained text, the permutation loss function being configured to process the first to-be-trained video and the second to-be-trained text and process the second to-be-trained video and the first to-be-trained text;
- determining, by the computer device, a diversity loss function according to the first to-be-trained video, the second to-be-trained video, the first to-be-trained text, and the second to-be-trained text, the diversity loss function being configured to process the first to-be-trained video and the first to-be-trained text and process the second to-be-trained video and the second to-be-trained text;
- determining, by the computer device, a target loss function according to the permutation loss function and the diversity loss function; and
- training, by the computer device, a to-be-trained interactor by using the target loss function, to obtain the interactor, the interactor being configured to output a matching score between the to-be-matched video and the to-be-matched text.

9. The method according to claim 8, wherein the determining, by the computer device, a permutation loss function according to the first to-be-trained video, the second to-be-trained video, the first to-be-trained text, and the second to-be-trained text comprises:
- obtaining, by the computer device, a first spatiotemporal candidate region set in the first to-be-trained video, and obtaining a second spatiotemporal candidate region set in the second to-be-trained video, the first spatiotemporal candidate region set comprising at least one first spatiotemporal candidate region, the first spatiotemporal candidate region being a video sequence, the second spatiotemporal candidate region set comprising at least one second spatiotemporal candidate region, and the second spatiotemporal candidate region being a video sequence;

calculating, by the computer device, a first matching score according to the first to-be-trained text and the second spatiotemporal candidate region set;

calculating, by the computer device, a second matching score according to the second to-be-trained text and the first spatiotemporal candidate region set;

calculating, by the computer device, a third matching score according to the first to-be-trained text and the first spatiotemporal candidate region set; and determining, by the computer device, the permutation loss function according to the first matching score, the second matching score, and the third matching score.

10. The method according to claim 8, wherein the determining, by the computer device, a diversity loss function according to the first to-be-trained video, the second to-be-trained video, the first to-be-trained text, and the second to-be-trained text comprises:

determining, by the computer device, a matching behavior distribution according to a first spatiotemporal candidate region set and the first to-be-trained text, the first spatiotemporal candidate region set being generated according to the first to-be-trained video, and the matching behavior distribution representing a matching relationship between each first spatiotemporal candidate region in the first spatiotemporal candidate region set and the first to-be-trained text;

performing, by the computer device, normalization processing on the matching behavior distribution, to obtain a target matching behavior distribution; and determining, by the computer device, the diversity loss function according to the target matching behavior distribution.

11. The method according to claim 8, wherein the determining, by the computer device, a target loss function according to the permutation loss function and the diversity loss function comprises:

obtaining, by the computer device, a control coefficient, and determining the target loss function according to the control coefficient, the permutation loss function, and the diversity loss function.

12. A computer device, comprising: a memory, a processor, and a bus system connected to the memory and the processor, and a plurality of instructions stored in the memory that, when executed by the processor, cause the computer device to perform a plurality of operations including:

receiving, by the computer device, a to-be-matched video and a to-be-matched text, wherein the to-be-matched text is not part of the to-be-matched video, the to-be-matched video comprising a plurality of frames, the to-be-matched text comprising at least one word, and the to-be-matched text having a to-be-matched text feature sequence corresponding to a target object;

invoking, by the computer device, a spatiotemporal candidate region generator to extract a spatiotemporal candidate region set from the to-be-matched video, the spatiotemporal candidate region set comprising N spatiotemporal candidate regions, N being an integer greater than or equal to 1, and each spatiotemporal candidate region corresponding to images within a respective video sequence in the to-be-matched video that include a candidate object;

performing, by the computer device, feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set and representing a respective candidate object in the respective spatiotemporal candidate region;

invoking, by the computer device, an attention-based interactor to obtain a matching score corresponding to each spatiotemporal candidate region, the interactor being configured to process the to-be-matched video feature sequence and the to-be-matched text feature sequence, and the matching score being used for representing a matching relationship between a respective candidate object in the spatiotemporal candidate region and the target object corresponding to the to-be-matched text; and selecting, by the computer device, from the spatiotemporal candidate region set, a target spatiotemporal candidate region having a highest matching score outputted by the interactor, and outputting the target spatiotemporal candidate region as representing the target object corresponding to the to-be-matched text.

13. The computer device according to claim 12, wherein the invoking a spatiotemporal candidate region generator to extract a spatiotemporal candidate region set from the to-be-matched video comprises:

invoking the spatiotemporal candidate region generator to obtain a candidate region and a confidence score of each frame in the to-be-matched video, each candidate region corresponding to a respective confidence score;

invoking the spatiotemporal candidate region generator to obtain a degree of overlap of similar image content between every two adjacent frames in the to-be-matched video; and invoking the spatiotemporal candidate region generator to generate the spatiotemporal candidate region set according to the candidate region and the confidence score of each frame and the overlap degrees.

14. The computer device according to claim 12, wherein the invoking an attention-based interactor to obtain a matching score corresponding to each spatiotemporal candidate region comprises:

invoking, by the computer device for each spatiotemporal candidate region, an encoder of the interactor to encode the to-be-matched video feature sequence corresponding to the spatiotemporal candidate region, to obtain a visual feature set, the visual feature set comprising at least one visual feature of a candidate object in the spatiotemporal candidate region;

invoking, by the computer device, the encoder of the interactor to encode the to-be-matched text feature sequence, to obtain a text feature set, the text feature set comprising at least one text feature of the target object;

invoking, by the computer device, the interactor to determine a visual text feature set according to the visual feature set and the text feature set, the visual text feature set comprising at least one visual text feature, the visual text feature representing a visual feature-based text feature; and invoking, by the computer device, the interactor to determine the matching score corresponding to the candidate object in the spatiotemporal candidate region and the target object according to the visual text feature set and the visual feature set.

15. The computer device according to claim 14, wherein the invoking an encoder of the interactor to encode the to-be-matched video feature sequence corresponding to the spatiotemporal candidate region, to obtain a visual feature set comprises:
calculating the visual feature set in the following manner:

$$H_p = \{h_t^p\}_{t=1}^{t_p}, \text{ and}$$

$$h_t^p = LSTM_p(f_t^p, h_{t-1}^p),$$

$H_p$ representing the visual feature set, $h_t^p$ representing a $t^{th}$ visual feature in the visual feature set, $t_p$ representing a time step in the spatiotemporal candidate region, $h_{t-1}^p$ representing a $(t-1)^{th}$ visual feature in the visual feature set, $LSTM_p(\ )$ representing a first long short-term memory (LSTM) network encoder, and $f_t^p$ representing a $t^{th}$ row of features in the to-be-matched video feature sequence; and the invoking the encoder of the interactor to encode the to-be-matched text feature sequence, to obtain a text feature set comprises:
calculating the text feature set in the following manner:

$$H_q = \{h_t^q\}_{t=1}^{t_q}, \text{ and}$$

$$h_t^q = LSTM_q(f_t^q, h_{t-1}^q),$$

$H_q$ representing the text feature set, $h_t^q$ representing a $t^{th}$ text feature in the text feature set, $t_q$ representing a word quantity of the to-be-matched text, $h_{t-1}^q$ representing a $(t-1)^{th}$ text feature in the text feature set, $LSTM_q(\ )$ representing a second LSTM encoder, and $f_t^q$ representing a $t^{th}$ row of features in the to-be-matched text feature sequence.

16. The computer device according to claim 14, wherein the invoking the interactor to determine a visual text feature set according to the visual feature set and the text feature set comprises:
invoking the interactor to calculate an attention weight of the text feature corresponding to the visual feature according to the visual feature set and the text feature set;
invoking the interactor to calculate a normalized attention weight of the text feature corresponding to the visual feature according to the attention weight; and
invoking the interactor to calculate the visual text feature set according to the normalized attention weight and the text feature.

17. The computer device according to claim 12, wherein the plurality of operations further comprise:
obtaining a first to-be-trained video, a second to-be-trained video, a first to-be-trained text, and a second to-be-trained text, the first to-be-trained video having a matching relationship with the first to-be-trained text, the first to-be-trained video having no matching relationship with the second to-be-trained text, the second to-be-trained video having a matching relationship with the second to-be-trained text, and the second to-be-trained video having no matching relationship with the first to-be-trained text;
determining a permutation loss function according to the first to-be-trained video, the second to-be-trained video, the first to-be-trained text, and the second to-be-trained text, the permutation loss function being configured to process the first to-be-trained video and the second to-be-trained text and process the second to-be-trained video and the first to-be-trained text;
determining a diversity loss function according to the first to-be-trained video, the second to-be-trained video, the first to-be-trained text, and the second to-be-trained text, the diversity loss function being configured to process the first to-be-trained video and the first to-be-trained text and process the second to-be-trained video and the second to-be-trained text;
determining a target loss function according to the permutation loss function and the diversity loss function; and
training a to-be-trained interactor by using the target loss function, to obtain the interactor, the interactor being configured to output a matching score between the to-be-matched video and the to-be-matched text.

18. A non-transitory computer-readable storage medium, storing instructions, the instructions, when executed by a processor of a computer device, causing the computer device to perform a plurality of operations including:
receiving, by the computer device, a to-be-matched video and a to-be-matched text, wherein the to-be-matched text is not part of the to-be-matched video, the to-be-matched video comprising a plurality of frames, the to-be-matched text comprising at least one word, and the to-be-matched text having a to-be-matched text feature sequence corresponding to a target object;
invoking, by the computer device, a spatiotemporal candidate region generator to extract a spatiotemporal candidate region set from the to-be-matched video, the spatiotemporal candidate region set comprising N spatiotemporal candidate regions, N being an integer greater than or equal to 1, and each spatiotemporal candidate region corresponding to images within a respective video sequence in the to-be-matched video that include a candidate object;
performing, by the computer device, feature extraction on each spatiotemporal candidate region in the spatiotemporal candidate region set by using a convolutional neural network, to obtain N to-be-matched video feature sequences, each to-be-matched video feature sequence corresponding to a respective spatiotemporal candidate region in the spatiotemporal candidate region set and representing a respective candidate object in the respective spatiotemporal candidate region;
invoking, by the computer device, an attention-based interactor to obtain a matching score corresponding to each spatiotemporal candidate region, the interactor being configured to process the to-be-matched video feature sequence and the to-be-matched text feature sequence, and the matching score being used for representing a matching relationship between a respective candidate object in the spatiotemporal candidate region and the target object corresponding to the to-be-matched text; and
selecting, by the computer device, from the spatiotemporal candidate region set, a target spatiotemporal candidate region having a highest matching score outputted by the interactor, and outputting the target spatiotemporal candidate region as representing the target object corresponding to the to-be-matched text.

19. The non-transitory computer-readable storage medium according to claim 18, wherein the invoking a spatiotemporal candidate region generator to extract a spatiotemporal candidate region set from the to-be-matched video comprises:
invoking the spatiotemporal candidate region generator to obtain a candidate region and a confidence score of each frame in the to-be-matched video, each candidate region corresponding to a respective confidence score;

invoking, by the computer device, the spatiotemporal candidate region generator to obtain a degree of overlap of similar image content between every two adjacent frames in the to-be-matched video; and invoking the spatiotemporal candidate region generator to generate the spatiotemporal candidate region set according to the candidate region and the confidence score of each frame and the overlap degrees.

20. The non-transitory computer-readable storage medium according to claim 18, wherein the invoking an attention-based interactor to obtain a matching score corresponding to each spatiotemporal candidate region comprises:

invoking, by the computer device for each spatiotemporal candidate region, an encoder of the interactor to encode the to-be-matched video feature sequence corresponding to the spatiotemporal candidate region, to obtain a visual feature set, the visual feature set comprising at least one visual feature of a candidate object in the spatiotemporal candidate region;

invoking, by the computer device, the encoder of the interactor to encode the to-be-matched text feature sequence, to obtain a text feature set, the text feature set comprising at least one text feature of the target object;

invoking, by the computer device, the interactor to determine a visual text feature set according to the visual feature set and the text feature set, the visual text feature set comprising at least one visual text feature, the visual text feature representing a visual feature-based text feature; and invoking, by the computer device, the interactor to determine the matching score corresponding to the candidate object in the spatiotemporal candidate region and the target object according to the visual text feature set and the visual feature set.

* * * * *